US00RE38710E

(19) United States
(12) Reissued Patent
Goto et al.

(10) Patent Number: US RE38,710 E
(45) Date of Reissued Patent: Mar. 15, 2005

(54) LASER PROCESS FOR MAKING A FILTER FOR AN INK JET

(75) Inventors: Akira Goto, Yokohama (JP); Masaki Inaba, Kawasaki (JP); Yutaka Koizumi, Yokohama (JP); Tsuyoshi Orikasa, Musashimurayama (JP); Toshio Kashino, Fujisawa (JP); Seiichiro Karita, Yokohama (JP); Shuji Koyama, Kawasaki (JP); Haruhiko Terai, Yokohama (JP); Kimiyuki Hayasaki, Yokohama (JP); Kouichi Omata, Kawasaki (JP); Kiyomitsu Kudo, Yokohama (JP); Takayuki Ono, Kawasaki (JP); Shin Ishimatsu, Yokohama (JP)

(73) Assignee: Canon Kabushiki Kaisha, Tokyo (JP)

(21) Appl. No.: 09/935,689

(22) Filed: Aug. 24, 2001

Related U.S. Patent Documents

Reissue of:
(64) Patent No.: 5,940,957
Issued: Aug. 24, 1999
Appl. No.: 08/397,360
Filed: Mar. 2, 1995

(30) Foreign Application Priority Data

Mar. 4, 1994 (JP) ..... 6-034932
May 11, 1994 (JP) ..... 6-097428

(51) Int. Cl.[7] ..... H05B 3/00; B23K 26/00
(52) U.S. Cl. ..... 29/611; 29/890.1; 219/121.72; 347/65; 347/93
(58) Field of Search ..... 29/611, 890.1; 219/121.68, 121.69, 121.72; 347/47, 93

(56) References Cited

U.S. PATENT DOCUMENTS 4,313,124 A * 1/1982 Hara ..... 346/140 R
4,345,262 A * 8/1982 Shirato et al. ..... 346/140 R
4,459,600 A * 7/1984 Sato et al. ..... 346/140 R
4,463,359 A * 7/1984 Ayata et al. ..... 346/1.1

(List continued on next page.)

FOREIGN PATENT DOCUMENTS

| | | | | |
|---|---|---|---|---|
| EP | 0379781 A2 | * | 8/1990 | |
| EP | 0488033 A2 | * | 6/1992 | |
| EP | 0 500 068 A2 | * | 8/1992 | |
| EP | 573014 A2 | * | 12/1993 | |
| EP | 0 670 221 A2 | | 9/1995 | |
| JP | 54-56847 | * | 5/1979 | |
| JP | 56-006208 | * | 1/1981 | |
| JP | 59-123670 | * | 7/1984 | |
| JP | 59-138461 | * | 8/1984 | |
| JP | 60-71260 | * | 4/1985 | |
| JP | 63-200524 | * | 8/1988 | |
| JP | 63-200584 | * | 8/1988 | |
| JP | 63-290755 | * | 11/1988 | ..... 347/65 |

(List continued on next page.)

*Primary Examiner*—I Cuda Rosenbaum
(74) *Attorney, Agent, or Firm*—Fitzpatrick, Cella, Harper & Scinto

(57) ABSTRACT

A common recess, grooves, and common recess and/or column members in the grooves are formed on a base board at the same time, and such board is made a second base board, which is coupled to a first base board on which elements for liquid discharging energy are formed; hence obtaining an ink jet recording head provided with a filter unit in an arbitrary position in the region formed by the ink paths and the common liquid chamber. The filter unit can be processed by a single processing in the ink paths and/or the common liquid chamber to make it possible to prevent disabled discharge from taking place due to dust particles intermingled at the time of head manufacture. In this way, the discharging stability is enhanced, making a high-speed printing possible. A workpiece is efficiently processed by a single processing which is performed to process a three-dimensional configuration with respect to the direction in which the laser beam is irradiated.

18 Claims, 9 Drawing Sheets

U.S. PATENT DOCUMENTS 4,539,569 A * 9/1985 Watanabe et al. ..... 346/140 R
4,558,333 A * 12/1985 Sugitani et al. ..... 346/140 R
4,608,577 A * 8/1986 Hori ..... 346/140 R
4,723,129 A * 2/1988 Endo et al. ..... 346/1.1
4,740,796 A * 4/1988 Endo et al. ..... 346/1.1
4,897,674 A * 1/1990 Hirasawa ..... 347/65
4,947,191 A * 8/1990 Nozawa et al. ..... 346/140 R
4,994,825 A * 2/1991 Saito et al. ..... 346/140 R
5,006,867 A * 4/1991 Koizumi et al. ..... 340/140 R
5,081,474 A * 1/1992 Shibata et al. ..... 346/140 R
5,141,596 A * 8/1992 Hawkins et al. ..... 156/628
5,148,192 A * 9/1992 Izumida et al. ..... 346/140 R
5,172,134 A * 12/1992 Kishida et al. ..... 346/1.1
5,208,604 A * 5/1993 Watanabe et al. ..... 346/1.1
5,208,980 A * 5/1993 Hayes ..... 29/890.1
5,235,351 A * 8/1993 Koizumi ..... 346/140 R
5,243,755 A * 9/1993 Inaba et al. ..... 29/890
5,281,980 A * 1/1994 Kishida et al. ..... 346/140 R
5,347,713 A * 9/1994 Shibata et al. ..... 29/890.1
5,361,087 A * 11/1994 Tajima et al. ..... 347/44
5,365,255 A * 11/1994 Inoue et al. ..... 347/45
5,371,528 A * 12/1994 Izumida et al. ..... 347/87
5,373,633 A * 12/1994 Satoi et al. ..... 29/890.1
5,508,725 A 4/1996 Goto et al. ..... 347/65
5,657,539 A 8/1997 Orikasa ..... 29/890.1
5,774,151 A 6/1998 Sugitani et al. ..... 347/63
5,808,644 A 9/1998 Imamura et al. ..... 347/93
5,933,163 A 8/1999 Koizumi et al. ..... 347/42
5,992,981 A 11/1999 Sugitani et al. ..... 347/63
6,045,214 A * 4/2000 Murthy et al.
6,155,677 A 12/2000 Kitani et al. ..... 347/65
6,158,843 A 12/2000 Murthy et al. ..... 347/47
6,168,254 B1 1/2001 Karita et al. ..... 347/20
6,231,166 B1 5/2001 Kawai ..... 347/63

FOREIGN PATENT DOCUMENTS

JP 2-121842 * 5/1990
JP 2-121845 * 5/1990 ..... 29/890.1
JP 2-187346 * 7/1990
JP 3-101954 * 4/1991
JP 3-101960 * 4/1991
JP 3-180355 * 8/1991
JP 4-9291 * 1/1992
JP 4-339585 * 11/1992
JP 4-368855 * 12/1992
JP 5-4348 * 1/1993 ..... 347/93
JP 5-208503 * 8/1993
JP 5-254120 * 10/1993
JP 5-338186 12/1993

* cited by examiner

LASER PROCESS FOR MAKING A FILTER FOR AN INK JET

Matter enclosed in heavy brackets [ ] appears in the original patent but forms no part of this reissue specification; matter printed in italics indicates the additions made by reissue.

*Notice: More than one reissue application has been filed for the reissue of Pat. No. 5,940,957. The reissue applications are application Nos. 09/935,689 (the present application) and 10/360,670, which is a divisional reissue of Pat. No. 5,940,957.*

BACKGROUND OF THE INVENTION

1. Field of the Invention

The present invention relates to an ink jet recording head and a method of manufacture therefor. More particularly, the invention relates to a method for manufacturing an ink jet recording head which comprises a fine structure that is formed by use of laser beam.

Also, the present invention relates to a laser processing apparatus for processing grooves or the like by irradiating laser beam onto a workpiece, an ink jet recording head whose grooves are processed by the laser processing apparatus, and an ink jet recording apparatus provided with such an ink jet recording head.

2. Related Background Art

Along with the provision of many nozzles and further reduction of its orifice diameter in order to obtain a high resolution by use of an ink jet recording head which performs printing by discharging ink droplets from the orifices of, for example, tens of $\mu$m each, the influence of dust particles intermingled when the head is manufactured or when ink flows in the head has become increasingly greater. Therefore it is necessary to take appropriate measures against such unfavorable influences. For example, there has been proposed a method for forming an ink supply inlet and filter at a time by application of Si anisotropic etching as disclosed in Japanese Patent Laid-Open Application No. 5-208503, and a method for providing a filter structure by use of a filter of a three-dimensional configuration in the ink path as disclosed in Japanese Patent Laid-Open Application No. 5-4348. Also, there is a method known as disclosed in Japanese Patent Laid-Open Application No. 3-180355 wherein a stainless steel mesh filter is provided in the ink path.

However, in accordance with the disclosure of Japanese Patent Laid-Open Application No. 5-208503, for example, the filter unit is obtained by such a patterning as to change its resistance against etching solution by implanting boron ions. This undesirably increases greatly the number of head manufacturing processes. Also, while the filter is provided for the ink supply inlet arranged on the upper part of the ink liquid chamber, no particular measures are taken in the manufacture processes to prevent the dust particles from adhering to the space between the ink liquid chamber and other parts.

Also, in accordance with the disclosure of the Japanese Patent Laid-Open Application No. 5-4348, a filler is to be mixed with resin. This makes it difficult to set the hole diameter of the filter freely. Also, in accordance with the disclosure of the Japanese Patent Laid-Open Application No. 3-180355, the number of manufacture processes needed to make the device are increased because of the steps needed to bury the stainless steel mesh filter in the liquid path.

Further, in recent years, laser oscillators are often used as light source for laser processing equipment. Particularly, attention is given to the ultraviolet pulse laser oscillators as a light source of laser processing at the time of abrasion when patterning is performed on polymer without any development. As laser processing apparatuses or systems for processing polymer by utilizing abrasion, there have been proposed those given below. Such apparatuses (disclosed in Japanese Patent Laid-Open Application No. 4-9291 and Japanese Patent Laid-Open Application No. 4-339585) comprise a laser light source; a given pattern; a masking unit provided with a mask which transmits the laser beam from the laser light source to the workpiece side through this pattern; a projection optical system for projecting the laser beam from the laser light source; and measurement and driving system for measuring the workpiece position and causing the workpiece to move.

A laser processing apparatus of this sort is mainly used for processing the discharge ports of an ink jet recording apparatus (refer to Japanese Patent Laid-Open Application No. 2-121842, Japanese Patent Laid-Open Application No. 2-187346, Japanese Patent Laid-Open Application No. 3-101954, Japanese Patent Laid-Open Application No. 3-101960) or for processing the ink paths of an ink jet recording head (Japanese Patent Laid-Open Application No. 2-121845), and for fine processing of other kinds.

In this respect, the ink jet recording head described above is particularly the one which adopts bubble jet method among those heads using ink jet recording methods. Here, the typical structure and principle of a recording apparatus using the bubble jet method are disclosed in the specifications of U.S. Pat. Nos. 4,723,129 and 4,740,796. These are applicable to either of the so-called on-demand type and the continuous type heads. To describe this method by exemplifying the on-demand type, electrothermal transducing elements are arranged for a sheet or liquid passage (ink path) capable of retaining liquid (ink), and then, these elements are caused to generate thermal energy in response to driving signals, hence creating film boiling on the thermoactive surface of a recording head. In this way, a resultant air bubble is formed in the liquid (ink) path one to one with respect to driving signals described above. With the development and contraction of this air bubble, liquid (ink) is discharged from each of the discharge ports in the form of an ink droplet. Here, as the driving signals thus given, it is preferable to make them pulse signals as disclosed in the specifications of U.S. Pat. Nos. 4,463,359 and 4,345,262. Also, regarding the rate of temperature rise on the aforesaid thermoactive surface, it is desirable to adopt the conditions disclosed in the specification of U.S. Pat. No. 4,313,124 for better performance.

The structure of the ink jet recording head described above is arranged by combining discharge ports (orifices), linear or right-angled liquid paths (ink paths), and electrothermal transducing elements as disclosed in each of the specifications described above, but beside these, it may be possible to arrange a structure where the thermoactive portion is provided in a curved domain as disclosed in the specifications of U.S. Pat. Nos. 4,558,333 and 4,459,600. Furthermore, the structure of the ink jet recording head described above may be such that a common slit is arranged as the discharge ports of electrothermal transducing elements in a plurality thereof as disclosed in Japanese Patent Laid-Open Application No. 59-138461, for example, or an aperture, which absorbs the pressurized waves of thermal energy, is arranged to face the discharge ports as disclosed in Japanese Patent Laid-Open Application No. 59-138461. In this respect, the ink jet recording heads disclosed in the specifications described above are arranged to secure its length corresponding to a given width by combining a plurality of recording heads, respectively. However, it may be possible to construct a single recording head having a length corresponding to a given width (the maximum width of the recording medium that a recording apparatus may be able to record on).

Also, the ink jet recording heads described above may be of the exchangeable chip type wherein the head can be electrically connected with the main body of an apparatus and is ready to receive ink supply, or can be of the cartridge type which is formed as a recording head itself.

However, when fine grooves and others are processed by use of a laser processing apparatus on a workpiece which constitutes a part of an ink jet recording head, it is impossible to form a groove having a three-dimensional wall in a single operation if the wall faces to be formed are three-dimensional with respect to the direction in which the laser beam is irradiated. In this case, multistage processing must be performed using two or more kinds of masks. As a result, a problem is inevitably encountered in that it takes a considerable time to complete processing of the workpiece. Further, the positions of subsequent processings and so on must be arranged to agree with the position of the first processing exactly, necessitating extremely high precision for the required image processing and the provision of a system enabling the precise stepping of workpiece movement, among some others, in order to execute such precise positioning exactly. These requirements result in making the apparatus itself large and more complicated.

On the other hand, among ink jet recording heads, there are some in which extrusions are formed in the ink paths to provide resistance to the ink flow for the purpose of enhancing the discharging properties of ink by controlling the ink supply force so that it stays more in the discharge port side, and that the ink foaming energy is not allowed to escape to the side opposite to the discharge ports. When the conventional laser processing apparatus is used to process grooves each with extrusions for the formation of the ink paths having such extrusions, productivity is extremely reduced for the reasons described above.

SUMMARY OF THE INVENTION

The present invention is designed in consideration of the problems described above. It is an object of the invention to provide an ink jet recording head having means for reducing the influence of dust particles to be mixed at the time of manufacture or flowing ink, which becomes increasingly greater along with the provision of many more nozzles and the reduction of the orifice diameter. In order to achieve this object, the present invention is provided in the following manner by:

(1) forming on a base board one or more elements for generating liquid discharging energy for discharging ink and making it a first base board;

(2) forming on another base board, a) a common recess, b) one or more grooves extending from the common recess to the end of the base board, having aperture serving as ink discharge ports, and c) one or more column members in an arbitrary portion of a region formed by the groove and common recess, and while maintaining conductivity from the common recess to the aperture, making the base board as a second base board;

(3) coupling the first base board and second base board in a mode in which the element for generating liquid discharging energy and the grooved recess correspond to each other; and providing one or more ink paths having a common liquid chamber and elements for generating liquid discharging energy, one end of the ink path being open to the common liquid chamber, and the end thereof becoming ink discharge ports; and forming a head in which the portion where the column members are arranged is made to be a filter unit for ink.

Now, in accordance with the present invention, it is also an object to provide a laser processing apparatus capable of processing a workpiece efficiently by processing a three-dimensional configuration with a single processing in the direction of laser beam irradiation. Also, this processing by use of such laser processing apparatus is meant to provide an ink jet recording head having excellent discharge properties while maintaining good productivity.

In order to achieve the objects described above, the laser processing apparatus of the present invention is provided with a laser light source, given patterns corresponding to the processing configuration of a workpiece, and a mask unit is provided with the mask which transmits laser beam from the laser light source to the workpiece side through such patterns.

This laser processing apparatus is characterized in that the mask unit is positioned in the luminous flux of the laser beam apart from the surface of the aforesaid mask by a certain distance, and arranged to be capable of installing on it a member which reflects or absorbs at least a part of the aforesaid laser beam.

Also, it may be possible to provide the laser processing apparatus with at least one system such as a beam adjustment optical system for reforming the laser beam from the laser light source, an optical system for illuminating the mask or a projection optical system for focusing the image of the pattern of the mask on the surface of the workpiece by a given magnification.

The aforesaid mask may be arranged in close contact with the aforesaid workpiece.

Further, the member which reflects or absorbs at least a part of the laser beam may be either the one which is able to adjust its position of installation relatively with respect to the mask or the one which is fixedly installed with respect to the mask.

Then the member which reflects or absorbs at least a part of the laser beam may be the one whose transmissively of the laser beam differs depending on its regions.

The laser light source may be one which can generate ultraviolet pulse laser. In this case, the ultraviolet pulse laser may be an Xe—Cl excimer laser, Kr—F excimer laser, Ar—F excimer laser, fourth harmonic of YAG laser, mixed waves of basic wave and secondary harmonic of YAG laser, or nitrogen gas laser.

An ink jet recording head of the present invention is provided with a base board having on it the elements for generating energy which can be utilized for discharging ink, and a board member coupled to this base board.

On this board member, there are formed a recess which constitutes an ink chamber for provisionally retaining the ink to be supplied to the discharge ports, and a groove each with an extrusion arranged in the intermediate section of the bottom wall, which forms each of the ink paths by conductively connecting the discharge ports and the ink liquid chamber through each element for generating energy.

At the same time, there is provided a mask having the pattern which corresponds to the aforesaid groove, and then, the grooves each with an extrusion are processed by the laser processing apparatus of the present invention where a member is installed for reflecting or absorbing at least a part of the laser beam by the provision of such extrusion. This constitutes the characteristics of the present invention.

Also, the aforesaid board member is made of polymer resin, and so it may be possible to adopt a laser light source which generates ultraviolet laser pulses laser in the laser processing apparatus. Further, it may be possible to use electrothermal transducing elements for generating thermal energy to be utilized for discharging ink as the aforesaid energy generating elements.

In this case, ink may be discharged from the discharge ports by utilization of film boiling to be created in ink by the thermal energy applied by the aforesaid electrothermal transducing element.

Then an ink jet recording apparatus of the present invention is provided with the aforesaid ink jet recording head prepared in accordance with the present invention, and records by discharging ink from the discharge ports of the ink jet recording head in response to recording signals.

In the laser processing apparatus constructed as described above in accordance with the present invention, it is possible to install a member which reflects or absorbs at least a part of the laser beam within the luminous flux of laser beam and in a position apart from the surface of the mask. Therefore, when a groove processing is executed, for example, the power of the laser beam irradiated becomes weaker on a workpiece in the location corresponding to the installed position of the aforesaid member than that of the laser beam irradiated on the other locations, making it possible to process the three-dimensional configuration by a single processing. Then, since the three-dimensional configuration can be processed by the single processing, it is unnecessary to provide means for exactly positioning the laser processing apparatus for the second processing and so on, simplifying the structure of the apparatus, accordingly.

Also, the aforesaid member can be installed in such a manner that its position is relatively adjustable with respect to the mask, thus making it possible to adjust the position and height of the three-dimensional portion corresponding to the processing part of the workpiece with respect to the pattern of the mask. As a result, when the aforesaid member is fixedly installed with respect to the mask, the processing configuration of a workpiece is uniquely determined. Further, with the transmissivity of the aforesaid member being made different for the laser beam depending on the regions, it becomes possible to process more complicated configurations. Then, with the laser light source being able to generate ultraviolet laser pulses, the polymer resin can be processed with fine resolution.

In accordance with an ink jet recording head and an ink jet recording apparatus of the present invention, grooves formed on the board member are processed by use of the laser processing apparatus of the present invention. Then the grooves each with an extrusion can be processed just by a single processing. Each extrusion thus processed provides resistance against ink flow in the ink path and enhances the discharging properties of ink by controlling the ink supply force to stay more on the discharge port side, and also, the ink foaming energy is not allowed to escape to the side opposite to discharge ports. As a result, compared to the case where no extrusion is provided, the discharging properties of ink become superior while there is no possibility that the productivity is unfavorably affected.

DETAILED DESCRIPTION OF THE PREFERRED EMBODIMENTS

Hereinafter, in conjunction with the accompanying drawings, the present invention will be described in detail.

Figure 1A:
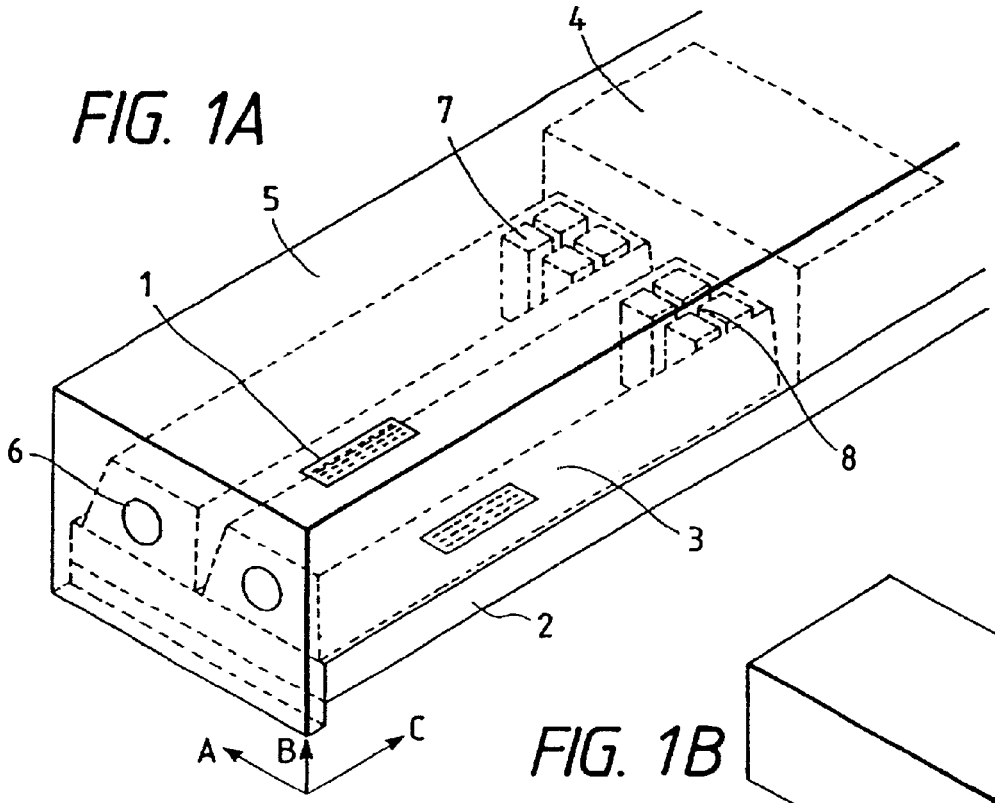
FIG. 1A is a perspective view which schematically shows an ink jet recording head in accordance with a first embodiment of the present invention.

FIG. 1A is a view which schematically shows one embodiment of an ink jet recording head in accordance with the present invention. In FIG. 1A, a reference numeral 1 designates an element for generating liquid discharging energy; 2, a first base board having the element for generating liquid discharging energy formed on it; 3, a recess for forming an ink path corresponding to the portion where the element 1 for generating liquid discharging energy is arranged; 4, a common liquid chamber; 5, a second base board having the recess 3 for forming the ink path and the common liquid chamber 4; 6, discharge ports for discharging ink by being conductively connected to the recess 3 for forming the ink path; 7, column members; and 8, a filter unit formed by the column members 7.

Here the term "passage" is used for representing both an ink path (flowing path) and a common liquid chamber.

Figure 3:
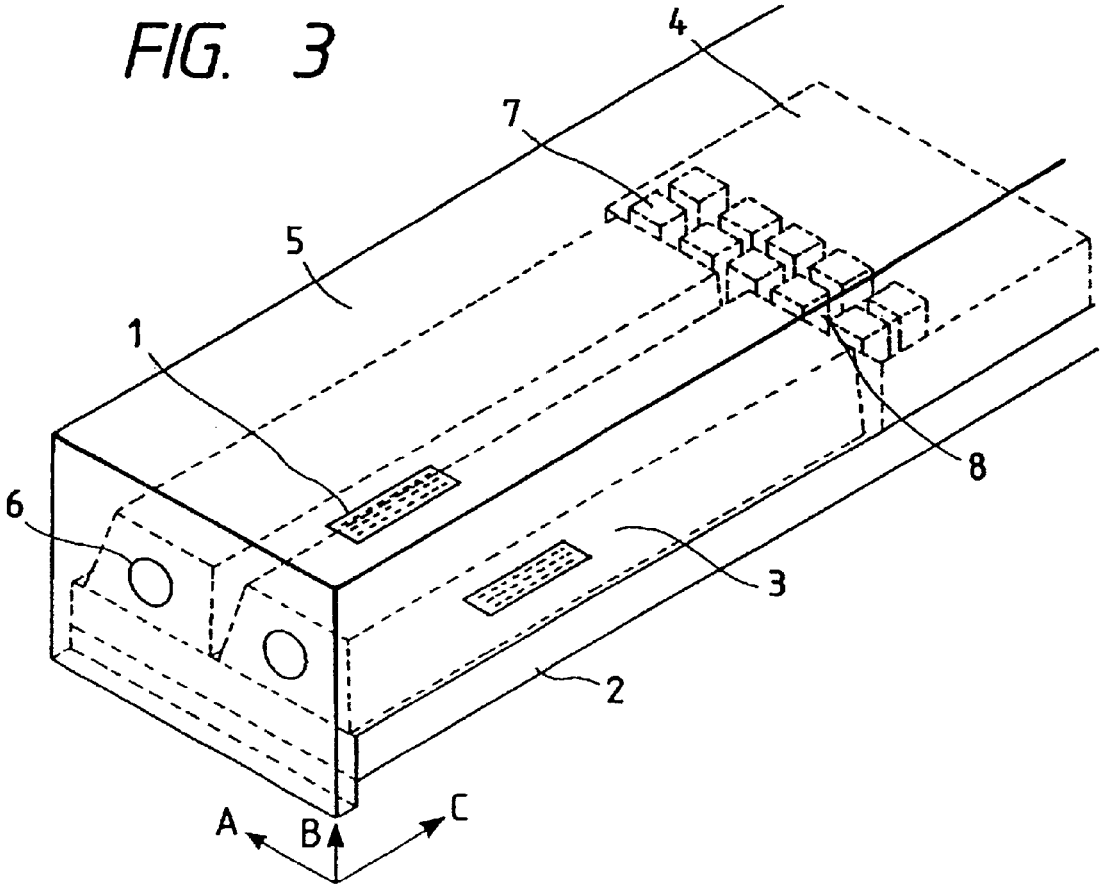
FIG. 3 is a perspective view which schematically shows an ink jet recording head in accordance with a second embodiment of the present invention.
Figure 5:
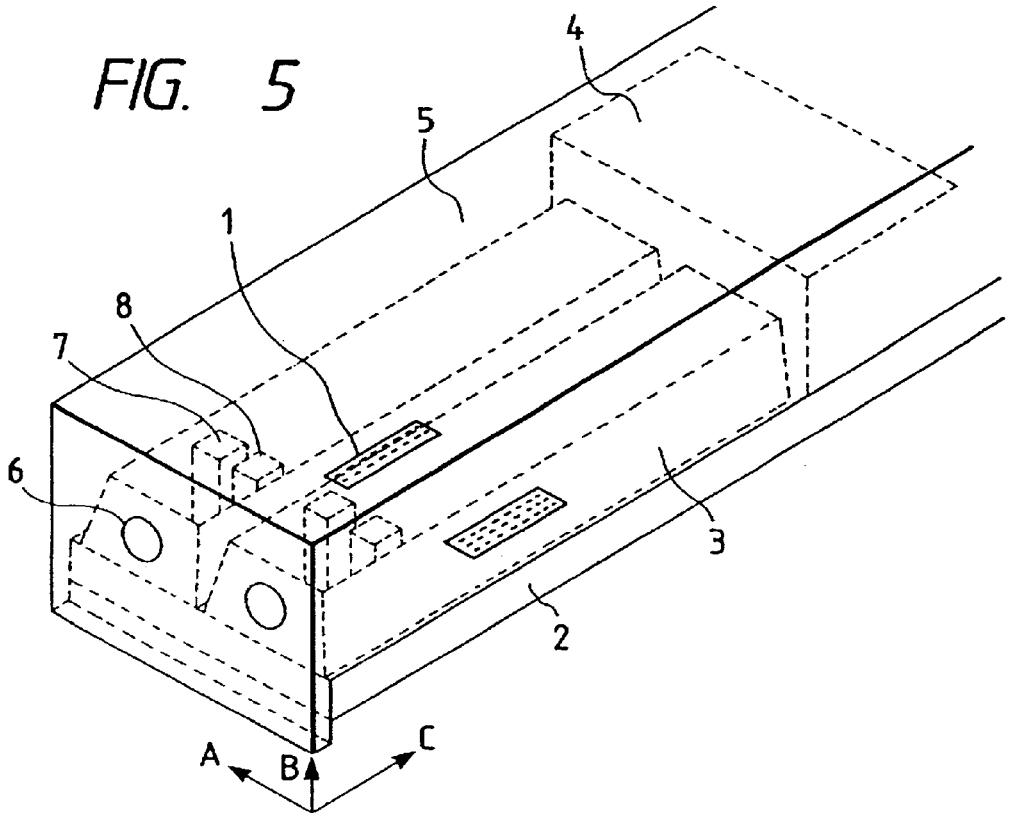
FIG. 5 is a perspective view which schematically shows an ink jet recording head in accordance with a third embodiment of the present invention.
Figure 6:
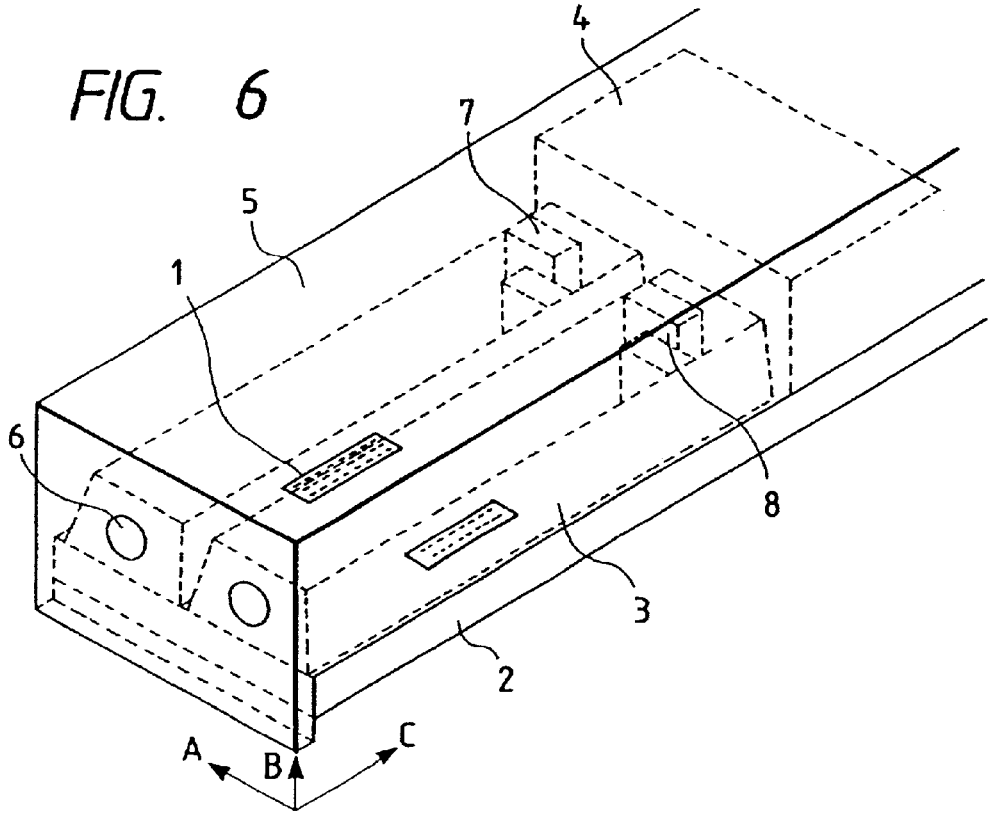
FIG. 6 is a perspective view which schematically shows an ink jet recording head in accordance with a fourth embodiment of the present invention.

In this case, the filter unit is arranged in the ink path, but if only the filter can produce an effect to prevent any defective discharge from being caused by dust particles, it may be possible to provide the filter in any mode in any location in the region formed by the common liquid chamber and the ink path. For example, as shown in FIG. 3, it may be arranged in the mode where the column members are arranged in parallel with the surface to which the ink path in the common liquid chamber is open or as shown in FIG. 5, it can be arranged just in front of the discharge ports. Further, as shown in FIG. 6, it may be in the mode where one end of a column member is in contact with the wall face of the ink path, and then, the column member adjacent to this one is in contact with the wall face of the ink path opposite thereto. Also, the location where the filter unit is arranged is not necessarily limited to one place, but it may be arranged in plural locations in one path or in both the ink path and the common liquid chamber.

Figure 2:
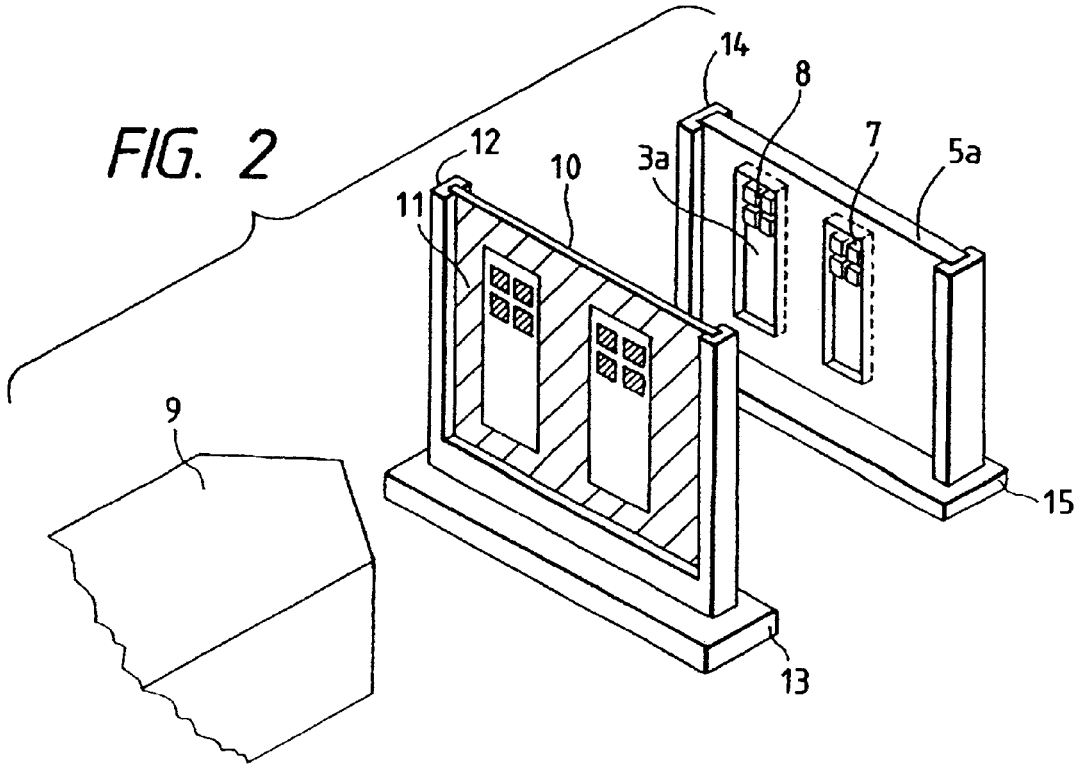
FIG. 2 is an exploded perspective view which shows a method for manufacturing the head represented in FIG. 1A.

In conjunction with the schematic view in FIG. 2, description will be made of a method for manufacturing an ink jet recording head having a filter unit of the kind described above as one embodiment of a manufacture made by use of a laser processing apparatus. In FIG. 2, reference numeral 9 designates the laser beam for processing a resin base board 5a which will become a second base board 5; 10, a mask for forming the groove 3a which should serve as the recess 3 for forming the ink path (or a part of the common liquid chamber or including the common recess which serve as an entire body), and column members 7; 11, a coating layer which does not allow the laser beam to be transmitted by reflecting or absorbing the laser beam; 12, a mask holder to fix the mask 10; 13, a board member A for supporting the mask holder 12; 14, a resin holder to fix the resin base board 5a; and 15, a board member B for supporting the resin holder 14.

As material for the second base board, resin is used, but preferably, polyether etherketone, polyether sulfone, or the like are used. Further, from the viewpoint of workability, it is preferable to use polysulfone as a desirable resin.

As the laser beam 9, an excimer laser beam of 248 nm wavelength can be used, for example. The mask 10 is formed from a material which transmits the laser beam such as one having quartz or glass as its base material.

In an arbitrary position of the pattern of the ink path and the common liquid chamber formed on the mask 10, the pattern serving to produce the column members is formed by a material which does not allow the laser beam to be transmitted (in FIG. 2, an example is shown in which this is formed in the pattern of the ink path).

It is possible to form the second base board used for a recording head of the present invention as a part or the entire body of the common liquid chamber, the grooves each serving as the ink path, and so the column members can be formed individually or entirely at one time. However, as described above, it is more advantageous if these are formed together keeping in mind considerations of cost, and also, keeping in mind avoiding any complicated operations.

The ink jet recording head, which can be obtained by coupling the second base board thus prepared and the first base board, is provided with the filter unit, contributing to reducing the frequency of disabled discharge due to the dust particles in ink, and providing a good printing quality.

Further, in accordance with the method of the present invention, it is possible to position the filter unit arbitrarily, and set the filter interval freely. Therefore, not only an appropriate measure can be taken against the dust particles, but also, an effect is obtainable to suppress the backward motion of the ink meniscus in high frequency printing. As a result, discharge stability is enhanced to improve high-speed printing.

Embodiment 1

Hereinafter, the present invention will be described in accordance with the embodiments.

FIG. 1A is a view which schematically shows an ink jet recording head in accordance with the present invention. In FIG. 1A, a reference numeral 1 designates an element for generation liquid discharging energy; 2, a first base board having the element for generating liquid discharging energy formed on it; 3, a recess for forming an ink path corresponding to the portion where the element 1 for generating liquid discharging energy is arranged; 4, a common liquid chamber; 5, a second base board having the recess 3 for forming the ink path and the common liquid chamber 4; 6, discharge ports for discharging ink by being conductively connected to the recess 3 for forming the ink path; 7, column members; and 8, a filter unit formed by the column members 7.

Figure 1B:
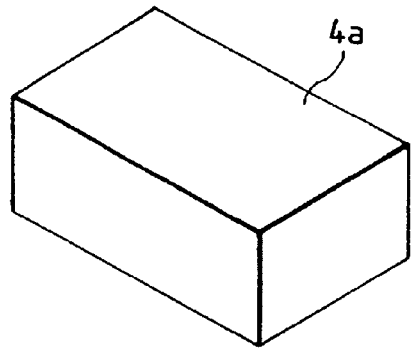
FIG. 1B is a schematic view of the first embodiment of the invention showing a mold for a common liquid chamber.

An element for generating thermal energy is used as the element 1 for generating liquid discharging energy. For the first base board 2, a thin board cut from a five-inch silicon wafer is used. For the second base board 5, polysulfone or some other resin, which is provided with a dent portion for a common liquid chamber formed from mold 4a shown in FIG. 1B, is used because this type of material is easy to be formed or processed by a laser beam.

Now, in conjunction with a schematic view shown in FIG. 2, the description will be made of a method for manufacturing an ink jet recording head having a filter unit 8 described above. In FIG. 2, a reference numeral 9 designates the laser beam used for processing the second base board 5; 10, the mask for forming the recess 3 to provide the ink path and column members 7; 11, the coating layer which reflects or absorbs the laser beam; 12, the mask holder which holds the mask; 13, a board member A for supporting the mask holder 12; 14, a resin holder for fixing the second base board 5; 15, a board member B for supporting the resin holder 14. An excimer laser beam having wavelength of 248 nm is used as laser beam 9. The mask 10 is formed from the quartz or glass as its base material which transmits the laser beam. The coating layer 11 is formed from deposited nickel or other suitable material. The structure of mask for forming the recess 3 and the column members 7 for the formation of the ink path is arranged in such a manner that the coating layer is provided for the mask 10 which is laminated in its configuration in advance, and after that, the laminated layer which is not exposed is removed. It is easy to change the size of the gaps in the filter unit 8 by designating the mask 10 accordingly.

Figure 7:
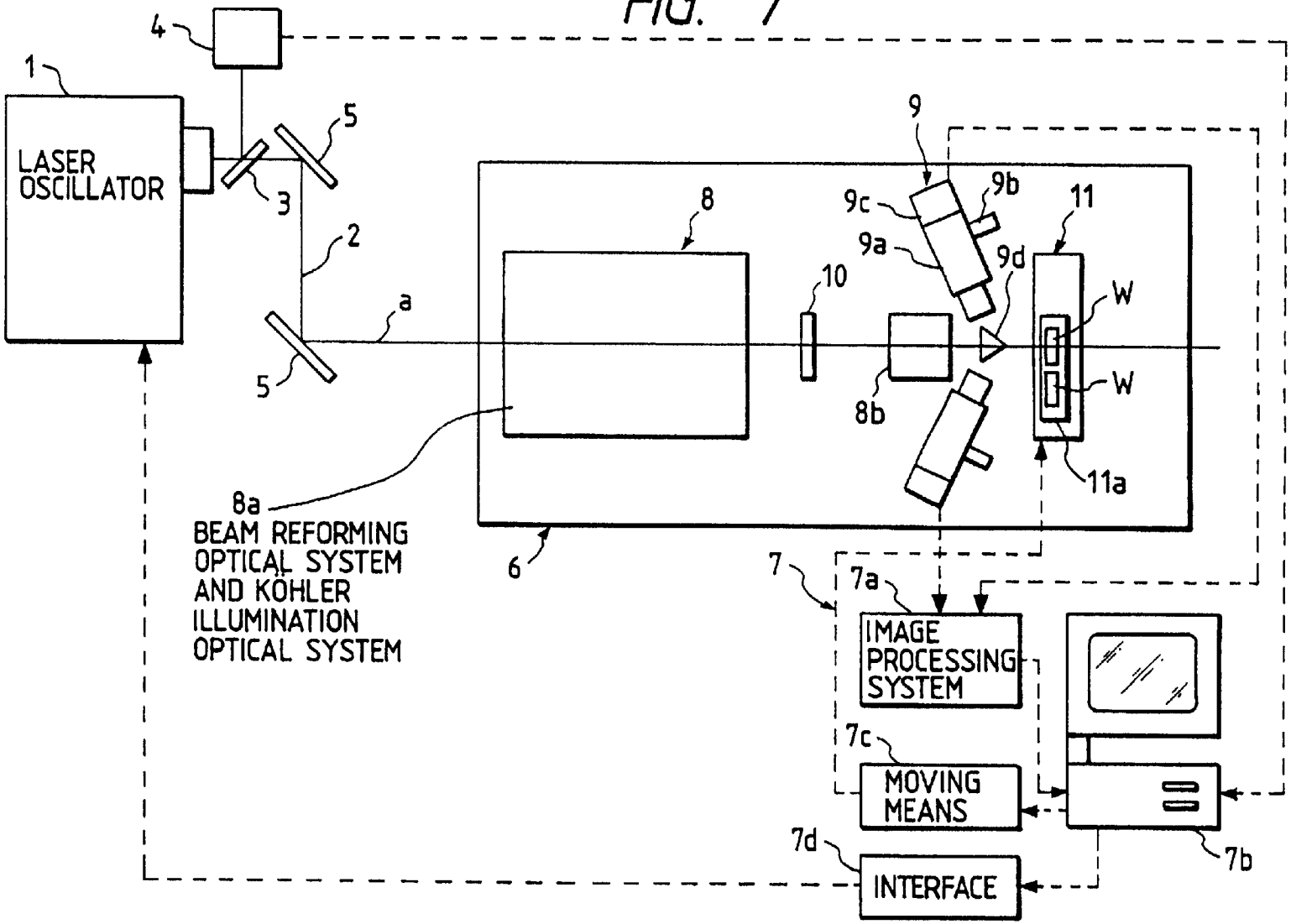
FIG. 7 is a view which schematically shows the structure of an ink jet recording head in accordance with a fifth embodiment of the present invention, which is manufactured by a laser processing apparatus.

In the present embodiment, the resin base material 5a is irradiated by 200 pulses of the laser energy concentration on the processing surface as IJ/cm$^2$/pulse, and then, a) it is possible to process a filter unit 8 having gaps of 13 $\mu$m at a time with the following arrangement:

256 pieces of ink path groove 6 each configured to be 50 $\mu$m×50 $\mu$m×500 $\mu$m in size (representing (dimension in the direction A)×(dimension in the direction B)×(dimension in the direction C) as seen in FIG. 1A) are formed with a pitch of 70 $\mu$m. In one ink path groove 6, there are formed in two rows, two column members 7 each configured to be 5 μm×50 μm×10 μm in the direction A in FIG. 1A, and two in the direction C, respectively.

b) also, it is possible to process a filter unit 8 having gaps of 10 μm under the same conditions of laser irradiation with the formation of two column members 7 each configured to be 10 μm×50 μm×10 μm in the direction A in FIG. 7.

c) likewise, it is possible to process the filter unit at a time in case of a structure where the column members are arranged in two rows in the direction C in FIG. 1A.

In the present embodiment, a relatively large common liquid chamber which communicates with plural liquid paths is previously formed by resin molding and relatively fine liquid paths are formed by laser projection, as a filter. The embodiment is preferable because a proper working process is applied to each liquid path.

With the provision of the filter unit 8 described above, the rate of disabled discharge due to dust particles at the time of printing is reduced by approximately 5% in either one of a) to c) in the preceding paragraphs as compared with the head which is not provided with the filter unit 8.

Also, when printing by using an ink jet recording head having the filter unit 8, it is possible to obtain a good printing quality even at the high driving frequency where the printing quality is usually lowered when using a head which is not provided with the filter unit 8.

Embodiment 2

Figure 4:
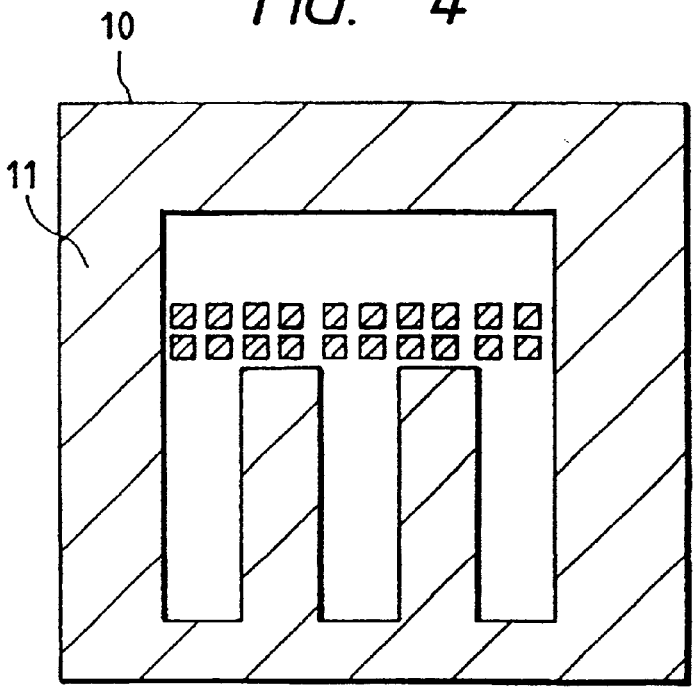
FIG. 4 is a view which schematically shows a mask configuration used for the second embodiment.

Now, another embodiment of the present invention will be described. A schematic view of an ink jet recording head is shown in FIG. 3 in which the filter unit described in the embodiment 1 is provided for the common liquid chamber. Also, FIG. 4 shows the configuration of the mask 10 used when manufacturing this head.

As shown in FIG. 3, two rows of the column members 7 each configured to be 10 μm×50 μm×10 μm (direction A×direction B×direction C) are arranged in the common liquid chambers 4 so that the gaps thereof become 10 μm. The column members can be processed at a time by the laser beam processing as in the embodiment 1, and the processing yield of the ink jet recording heads and the printing quality thereof are improved.

Embodiment 3

Now, the description will be made of another embodiment in accordance with the present invention. FIG. 5 is a view which schematically shows an ink jet recording head for which the filter unit is provided between the elements for generating liquid discharging energy and the orifices. In the ink path groove 6, a filter unit having a gap of 13 μm can be manufactured by laser beam processing under the same condition as the first embodiment by arranging two column members 7 each configured to be 5 μm×50 μm×5 μm (direction A×direction B×direction C) in one row in the direction A. Also, both the manufacturing yield and printing quality of the ink jet recording heads thus processed are improved.

Embodiment 4

Description will be made of another embodiment in accordance with the present invention. As shown in FIG. 6, the column members 7 each in contact with one side face of the ink path 6 and configured to be 30 μm×50 μm×10 μm (direction A×direction B×direction C) are arranged in two rows alternately in the ink path groove 6, and then, an ink jet recording head is manufactured with its filter unit 8 having a gap of 20 μm.

Laser beam processing is conducted under the same conditions as in the second embodiment. The manufacturing yield and printing quality of the ink jet heads thus processed are improved. Also, in this case, the mask 10 for forming the filter unit 8 can be prepared by depositing the coating layer 11 in order to provide the same structure as the one used for the embodiment 2, but the mask may be prepared by etching Ni or some other metals.

Embodiment 5

FIG. 7 is a view schematically shows the structure of a laser processing apparatus in accordance with a fifth embodiment of the present invention. As shown in FIG. 7, the laser processing apparatus of the present embodiment comprises a laser oscillator 1 serving as the last light source for generating the laser beam 2; an apparatus frame 6 having a processing system for processing a workpiece W by application of the laser beam 2 from the laser light source; an information processing and controlling system 7 for processing information and performing control with respect to the processing of the workpiece W.

The laser beam 2 generated from the laser oscillator 1 is partially reflected by a beam splitter 3. The reflected beam is monitored by a power detector 4. On the other hand, the laser beam 2, which is transmitted through the beam splitter 3, is reflected by a total reflection mirror 5 to be incident upon the apparatus frame 6. As the beam splitter 3, a plane-parallel board made of synthetic quartz is used for separating a part of the laser beam 2 only by the surface reflection.

The apparatus frame 6 comprises an optical system 8, an observation and measurement system 9 for observing and measuring the position of a workpiece W; a mask unit 10; and a work station 11 for operating the workpiece W to move. The optical system 8 comprises a beam reformation optical system and Köhler illumination optical system 8a arranged on the optical axis a of the laser beam 2 incident upon the apparatus frame 6, and a projection optical system 8a for focusing the image of the mask unit 10 on the processing surface of the workpiece W. The mask unit 10 is arranged between the beam reformation optical system and köhler illumination optical system 8a, and the projection optical system 8b. Here, in consideration of the durability of the mask unit 10, it is preferable to use a contraction optical system for the projection optical system 8b. In the present embodiment, a projection optical system 8b of ¼ contraction power is adopted.

In order to adjust the inclination of the workpiece W with respect to the optical axis a described above, it is preferable to provide the work station 11 with an appropriate adjusting means. For example, it may be possible to structure the work station 11 by combining three axes orthogonal to each other, and a stage having freedom with respect to the five axes which can rotate around two axes. It is possible to simplify the control of the adjusting means by arranging the structure so that the center of rotational adjustment is brought into agreement with the processing center of the workpiece W.

To position the workpiece W on the work station 11, it is preferable to provide a jig 11a for installing the workpiece W on the work station 11 with a plurality of standard pins which abut upon the workpiece W mounted on the work station 11. Also, on the jig 11a, a clamp mechanism using air suction may be arranged in addition to the abutting mechanism described above, and this clamp mechanism is integrated with an auto-hand so that the workpieces W can be supplied to the work station 11 automatically. Also, it may be possible to shorten the time occasionally by setting a plurality of works W on the work station 11 at a time. In this case, however, it is necessary to change the standard values at the time of measuring and moving the workpiece W because one axis in the rotational direction of the adjusting means cannot be positioned in the center of the workpiece W.

The observation and measurement system 9 comprises a lens barrel 9a having an object lens; a light source 9b for downward illumination incorporated in the lens barrel 9a; a pair of measuring instruments having a CCD camera sensor 9c connected to the lens barrel 9a; and a two-faced mirror 9d arranged on the optical axis a. Each of the measuring instruments and mirror 9d is arranged between the projection optical system 8b and the work station 11, and then, when the laser beam is irradiated, the mirror 9d is removed from the optical axis a. It is shifted onto the optical axis a only when the measurement is conducted. In the present embodiment, the movement of the mirror 9d is controlled by an air cylinder mechanism.

To the information processing and controlling system 7, the positional data on the workpiece W provided by the observation and measurement system 9, and data on the beam power provided by the power detector 4 are obtained as feedback information. At first, the result of measurements by the observation and measurement system 9 is brought to the image processing system 7a per measuring instrument, while the result of the signal processing is supplied to the controlling system 7b. In accordance with the result of the measurement described above, the controlling system 7b calculates the moving distance of the workpiece W, thus enabling the moving means 7c to effectuate stepping movements in the work station 11. Then, when the value of the observation and controlling system 9 reaches a specific value, the positional adjustment by the moving means 7c is terminated. The mirror 9d is removed from the optical axis a. Then the signals for actuating the laser oscillator 1 are given to generate the laser beam 2 for a given period or a given number of pulses. Also, the information of the beam power from the power detector 4 is supplied to the controlling system 7b as feedback information so as to adjust the output given to the laser oscillator 1 through an interface 7d.

As the laser oscillator 1 used for the laser processing apparatus of the present invention, a YAG laser oscillator, $CO_2$ laser oscillator, excimer laser oscillator, $N_2$ laser oscillator, or other oscillators having high output can be used, but in the present embodiment, a kind of polymer resin, polysulfone resin, is used for the workpiece W. For the reasons given below, therefore, an excimer laser oscillator, particularly, a Kr—F excimer laser oscillator, is used.

The excimer laser is one capable of oscillating ultraviolet beams, thus outputting a highly intensified energy. This has superior monochromatism, and is capable of providing a good orientation, among other advantages such as making short pulses oscillation possible, and providing a great concentration of energy by use of a converting lens. In other words, the excimer laser oscillator is capable of oscillating ultraviolet beam of short pulses (15 to 35 ns) by discharge pumping of a mixed gaseous body of rare gas and halogen, and Kr—F, Xe—Cl, Ar—F laser or the like is often used. The energy of the beam is 100 mJ/pulse. The pulse repeating frequency is 30 to 100 Hz. When such a short ultraviolet pulse beam having a high luminance is irradiated on the surface of polymer resin, the irradiated portion is instantaneously decomposed and caused to spread with accompanying plasma luminescence and impacting sound. The so-called ablative photodecomposition (APD) process takes place, thus making it possible to process polymer resin. This gives a distinct difference from other types of laser processing, such as drilling by application of a $CO_2$ laser, which is infrared. For example, if a laser beam is irradiated onto a polyimide (PI) film by use of excimer laser (Kr—F laser), it is possible to drill a fine hole because the light absorption wavelength of the PI film is in the UV domain. However, the use of YAG laser which is not in the UV domain results in a hole having a rough edge. The use of a $CO_2$ laser brings about a crater on the circumference of the hole.

As described above, the laser which can oscillate ultraviolet beam is excellent in processing polymer resin. As a laser capable of oscillating ultraviolet beam, there can be used a fourth harmonic wave of YAG laser, a mixed beam of the base wave of the YAG laser and second harmonic wave thereof, and a $N_2$ laser, as well as an excimer laser. These lasers are also usable for the protein invention.

Now, the description will be made of the workpiece W. The workpiece W processed in the present embodiment is one of the parts constituting an ink jet recording head used for an ink jet recording apparatus. More specifically, it is a ceiling board 19, a board member of the ink jet recording head shown in FIG. 8 and FIG. 9. Here, in conjunction with FIG. 8 and FIG. 9, description will be made of an ink jet recording head. The ink jet recording head comprises a silicon substrate 20 on which the energy generating elements are patterned for generating the energy which is utilized for discharging ink, and a ceiling board 19 which is coupled to the substrate 20. As the energy generating elements, electrothermal transducing elements 18 (heat generating resistive elements or the like) are used, which generate thermal energy when voltage is applied thereto. A plurality of electrothermal transducing elements 18 are arranged in parallel, and are formed integrally on the substrate 20 by application of film formation technique, together with wiring made of aluminum or the like for supplying power to the electrothermal transducing elements 18. On the other hand, for the ceiling board 19, there are generally provided altogether the grooves 19b, which constitute ink paths 14, being formed corresponding to each of the electrothermal transducing elements; a recess 19a which constitutes an ink liquid chamber 13 for provisionally retaining ink to be supplied to each of the ink paths 14; an ink supply inlet 12 for supplying ink from an ink tank (not shown) to the ink liquid chamber 13; and an orifice plate 17 having a plurality of discharge ports formed on it corresponding to each of the ink paths 14. Also, on the bottom wall in the intermediate section of each groove 19b, an extrusion 15 is formed, respectively, thus the cross-section of each ink path 14 is made smaller in the intermediate section thereof.

This extrusion 15 functions to provide resistance when ink flows in each of the ink paths 14 to enhance the ink discharge properties by preventing the ink foaming energy given by each of the electrothermal transducing elements from escaping to the ink liquid chamber side. On the basis of the structure described above, when each of the electrothermal transducting elements 18 is supplied with power, the respective electrothermal transducing element is caused to generate thermal energy to create film boiling in ink on the electrothermal element, thus foaming air bubble in the ink path. Then by the development of this air bubble, an ink droplet is discharged from each of the discharge ports 16.

Figure 9:
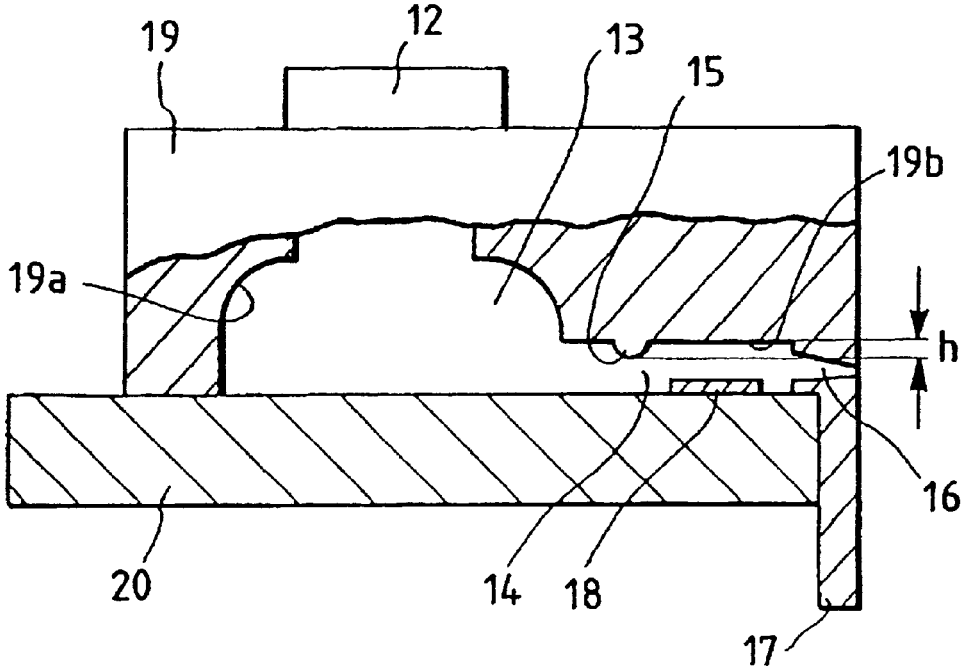
FIG. 9 is a partial cross-sectional view which shows the ink jet recording head represented in FIG. 8.
Figure 10:
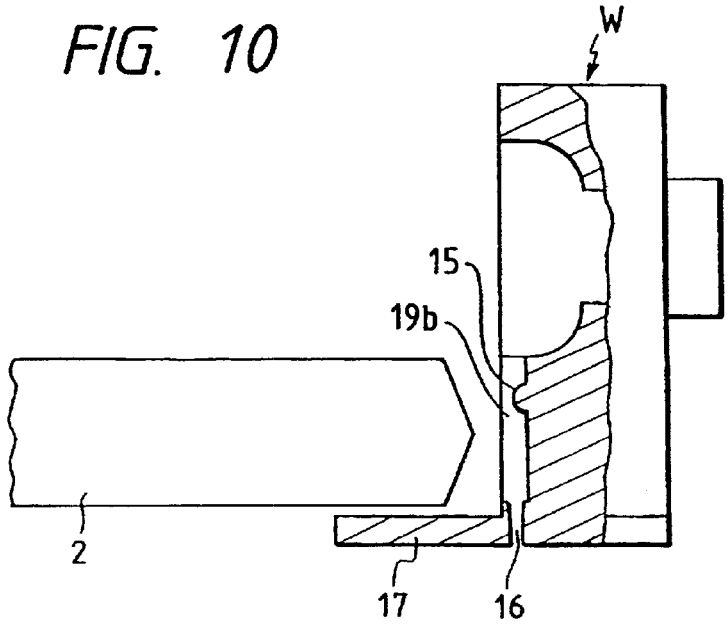
FIG. 10 is a partial cross-sectional view which shows a workpiece which serves as the ceiling represented in FIG. 8 and FIG. 9.

As shown in FIG. 10, each of the grooves 19b on the ceiling board 19 (workpiece W) each with the extrusion 15 described above is processed by irradiating laser beam 2 from the side of the surface coupled with the substrate 20 (see FIG. 9) by use of the laser processing apparatus of the present embodiment. Also, each of the discharge ports 16 is processed by use of the laser processing apparatus of the present embodiment. In this respect, the discharge ports 16 may be processed either before or after the grooves 19b are processed. In the present embodiment, the discharge ports 16 are processed by the irradiation of a Kr—F excimer laser from the groove 19b side after the grooves 19b are processed. Also, it is preferable to form the workpiece W by injection molding of material such as polysulfone, polyether sulfone, polyphenylene oxide or other materials having a good resistance to ink. In the present embodiment, the workpiece is formed by injection molding of polysulfone.

Also, when each of the grooves 19 is processed, it is preferable to incline the workpiece W slightly to the optical axis a in order to prevent the laser beam 2 from being blocked by the orifice plate 17. In the present embodiment, the grooves 19 are processed while the workpiece W is inclined at an angle of 5° with respect to the optical axis a.

Figure 11:
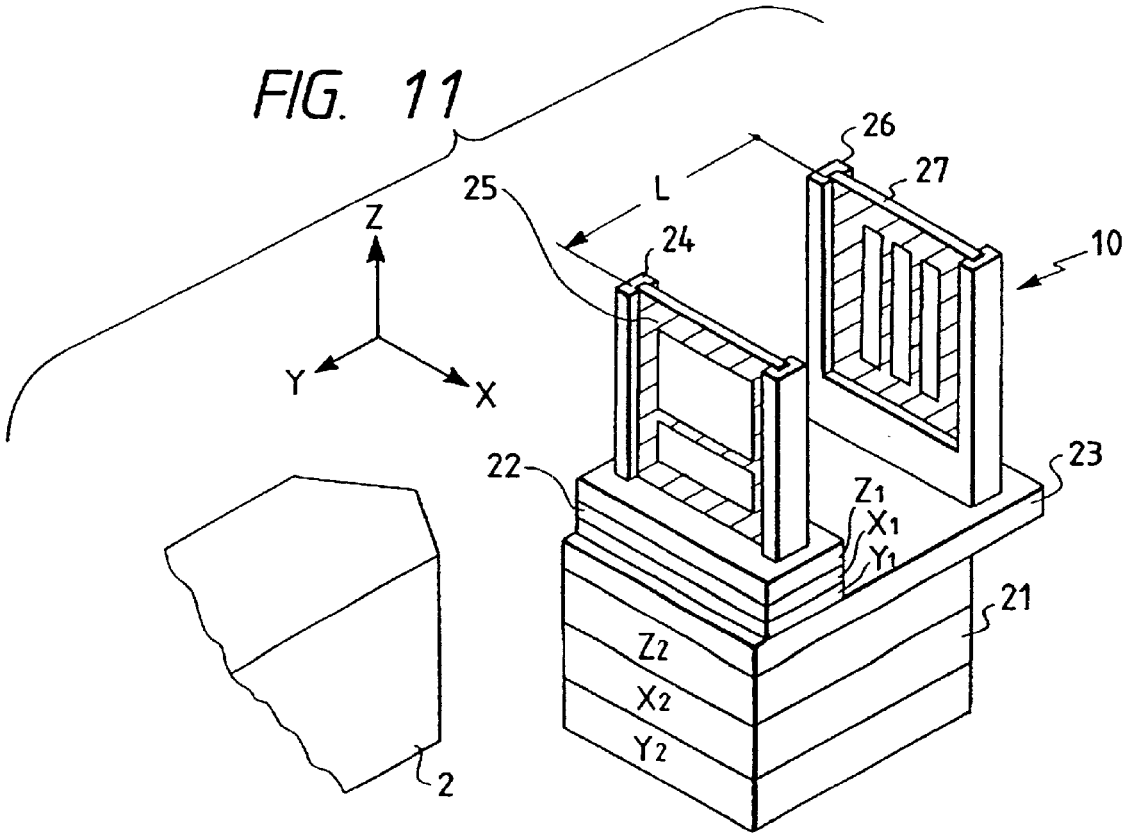
FIG. 11 is a perspective view which shows a mask unit of the laser processing apparatus represented in FIG. 7.

Now, with reference to FIG. 11, mask unit 10 will be described. FIG. 11 is a perspective view of the mask unit represented in FIG. 1A. In FIG. 11, a board member 23 is fixed to a second movable mechanism 21 arranged for the apparatus frame 6 (see FIG. 7) which is finely movable in the direction X, direction Y, and direction Z. On the one end of the board member 23 on the laser light source side, there is arranged a holder 24 for detachably holding a member 25 for forming extrusions which serve as a member for reflecting or absorbing at least a part of laser beam. The extruded portions 15 (see FIG. 19) are thus formed through a first movable mechanism 22 which is also finely moveable in the direction X, direction Y, and direction Z. Also on the end of the board member 23 on the workpiece W (see FIG. 7) side, a mask holder 26 is fixed for detachably holding the mask 27 for forming the grooves 19b (see FIG. 9). The mask 27 and the member 25 for forming extrusions are arranged in parallel within the luminous flux of the laser beam 2, and are separated from each other by a distance L in the optical axis of the laser beam 2. In this way, it is possible to adjust the position of the member 15 for forming extrusions in the X, Y, and Z directions with respect to the mask, and also the position of the mask 27 in the X, Y, and Z directions with respect to the direction of the optical axis of the laser beam 2. It is preferable to make the first movable mechanism 22 and second movable mechanism 21 the movable stages which provide three or more axes. Also, the first movable mechanism 22 may be installed on the mask holder 26.

The mask 27 is provided with the pattern of grooves 19 formed in a size of as large as four times, and the laser beam 2 which transmits the mask 27 is contracted to a size as small as ¼ times by means of the projection optical system 8b (see FIG. 7) as described earlier. Therefore, the pattern of a desirable size is focused on the workpiece W. Mask 27 can be made from material such as stainless steel, Ni, phosphor bronze, Al, opaque ceramics, quartz plate with a reflective coating, Si, or the like, so that the mask is not affected by the irradiation of the laser beam 2 of excimer laser in the atmosphere (air). In the present embodiment, the mask is prepared for use by forming the pattern on phosphor bronze by application of etching and others.

On the other hand, the member 25 for forming extrusions is the one prepared by the material which does not allow the laser beam 2 to transmit and positioned to face the extrusion 15 (see FIG. 9). In the present embodiment, this member is prepared for use by adhesively bonding to the frame of phosphor bronze an Al wire of ϕ50 μm for wire bonding use as the member which does not allow the laser beam 2 to transmit. In this aspect, the projection optical system used for the present embodiment projects the mask image with its left, right, up and down sides reversely. Therefore, the member 25 for forming extrusions should be arranged in consideration of this particular point.

With the structure described above, the grooves 19b of the ceiling board 19 shown in FIG. 9 are formed. The height h of the extrusion 15 shown in FIG. 9 can be adjusted by changing the distance L from the surface of the mask 27 to the member 25 for forming extrusions shown in FIG. 10. In the present embodiment, the distance L is set at 20 mm. Also, the position of the extrusion 15 with respect to each groove 19b is arbitrarily changeable by adjusting the holder 24 in the direction Z by use of the first movable mechanism shown in FIG. 10. In the present embodiment, it is possible to form by a single processing 64 grooves 19b each having an extrusion 15 of 30 μm high in a dimension of height, 50 μm×width, 50 μm×length, 500 μm at a pitch of 70 μm. This way, an ink jet recording head having excellent discharge properties can be obtained without reducing productivity.

Embodiment 6

Figure 12:
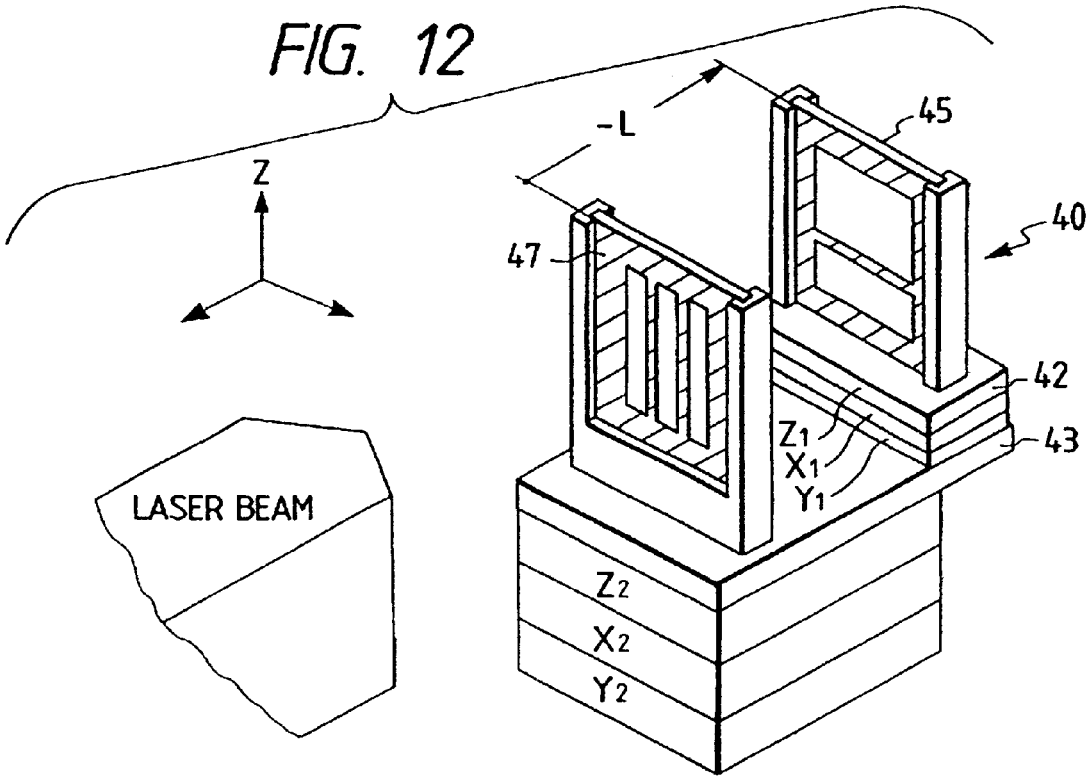
FIG. 12 is a perspective view which shows a mask unit in accordance with a sixth embodiment of the present invention, which is processed by a laser processing apparatus.

FIG. 12 is a perspective view which shows a sixth embodiment of a mask unit for a laser processing apparatus in accordance with the present invention. The present embodiment differs from the embodiment 5 in that a mask 47 is arranged on the laser light source side, and a member 45 for forming extrusions is arranged. In other words, the mask 47 is fixed on the end portion of the board member 43 on the laser light source side, and the member 45 for forming extrusions is arranged on the end portion on the workpiece side through a first movable mechanism 42. The structure of the entire body of the laser processing apparatus including the other structural aspects of the mask unit 40 are the same as that of the embodiment 5. Therefore, description thereof will be omitted.

Using such mask unit 40, the grooves are processed on the same workpiece as shown in the embodiment 5 under the same processing conditions as those in the embodiment 5. With a single processing, it is possible to obtain grooves equal to those shown in FIG. 10. In the present embodiment, too, the height of the extrusion 15 can be adjusted by changing a distance from the surface of mask 47 to the member 45 for forming extrusion minus L.

Embodiment 7

In the two embodiments described above, examples are shown, in which the mask and the member for forming extrusions are arranged with its relative positional relationship being adjustable. However, it is not required for the work of the same specifications to adjust any relative positions between the mask and the member for forming extrusions once the position and height of extrusion is determined with respect to each groove to be processed by the laser processing apparatus.

Figure 13:
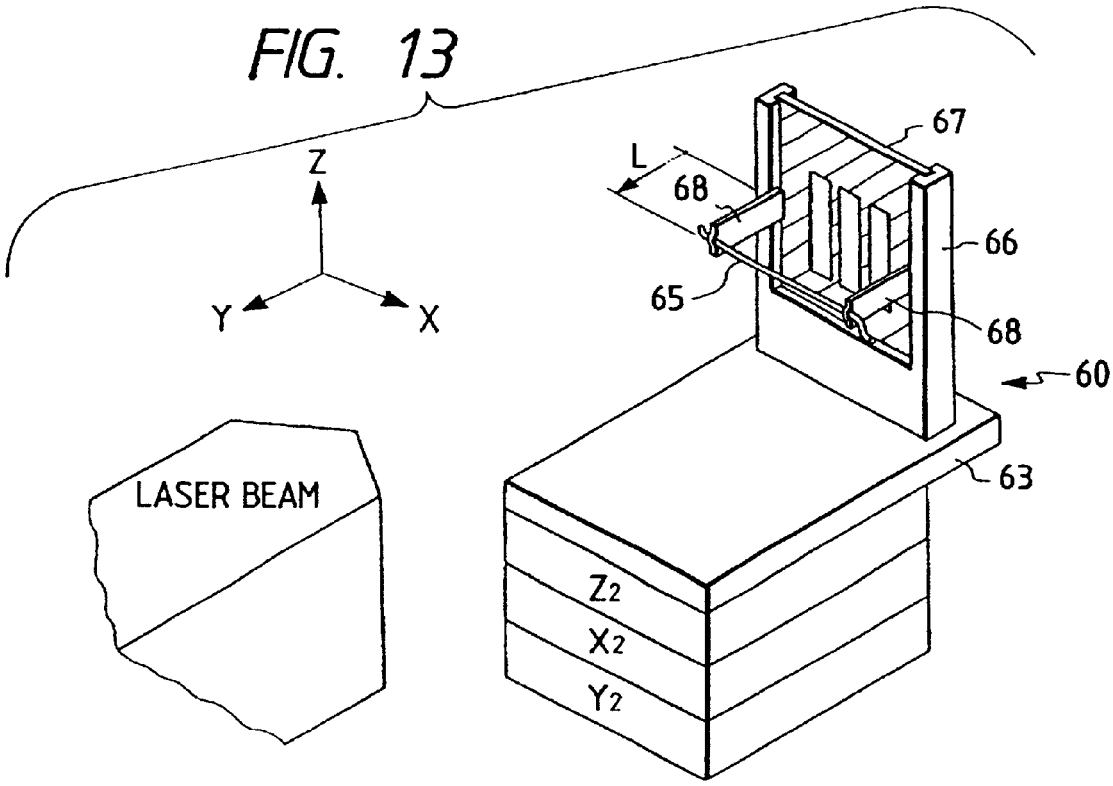
FIG. 13 is a perspective view which shows a mask unit in accordance with a seventh embodiment of the present invention, which is processed by a laser processing apparatus.

In the present embodiment, therefore, a mask 67 is detachably held by a mask holder 66 fixed to the board member 63 as shown in FIG. 13, and then, two spacers 68 are provided for this mask 67 integrally. To the leading end of each spacer 68, Al wire 65 of ϕ50 μm for wire bonding use is fixedly by use of UV hardening adhesives as a member for reflecting or absorbing at least a part of the laser beam. The fixing position of each spacer 68 and the distance L from the surface of the mask 67 to the Al wire 65 are determined by the position of extrusion 15 and the height of the extrusion 15 with respect to the groove 19 shown in FIG. 10. The other structures are the same as those of the embodiment 5. Therefore, the description thereof will be omitted.

With the mask unit 60 described above, grooves are processed on the same workpiece as shown in the embodiment 5 under the same conditions as the embodiment 5. Then, it is possible to obtain the grooves equal to those shown in FIG. 10 in a single processing. In this respect, Al wire 65 may be arranged either on the laser light source side with respect to the mask 67 as shown in FIG. 13 or on the workpiece side which is opposite thereto. Also, each spacer 68 may be installed on the mask holder 66 which supports the mask 67.

As described above, by fixing the positional relationship between the mask 67 and Al wire 65, the processing configuration of a workpiece can be determined uniquely, thus avoiding any errors in selling the position and height of each extrusion to be formed on the workpiece.

Embodiment 8

Figure 14:
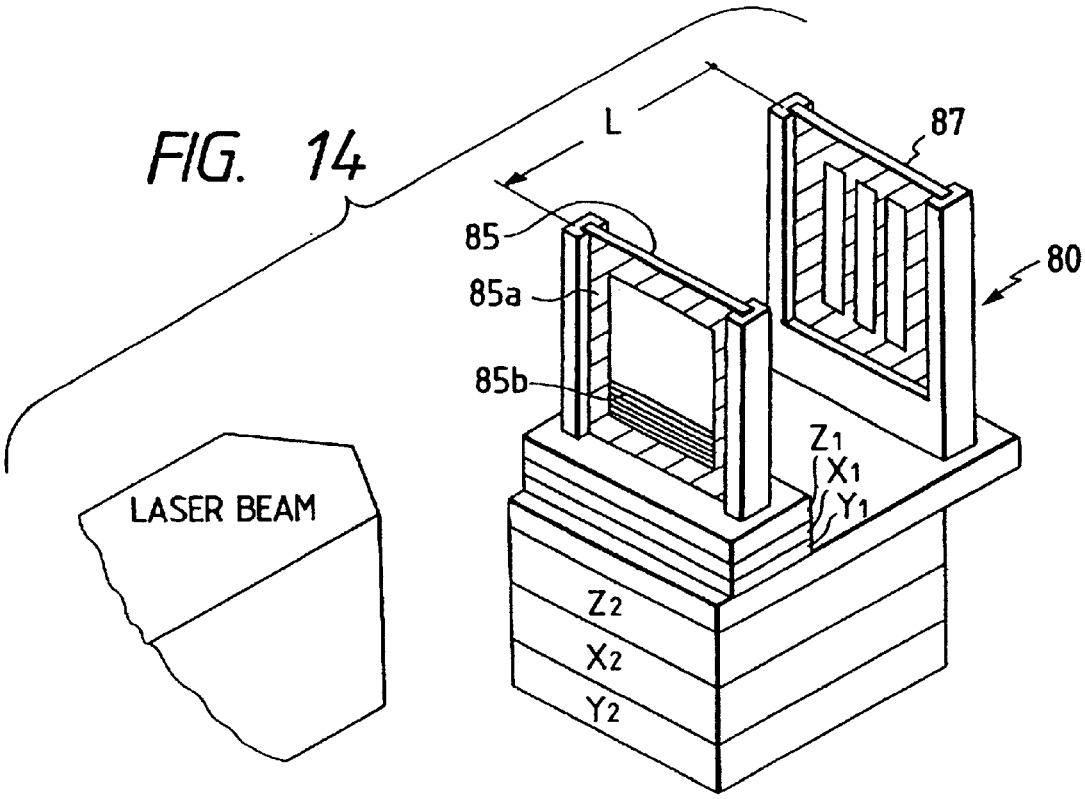
FIG. 14 is a perspective view which shows a mask unit in accordance with an eighth embodiment of the present invention, which is processed by a laser processing apparatus.

FIG. 14 is a perspective view which shows an eighth embodiment of a mask unit for a laser processing apparatus in accordance with the present invention. In the present embodiment, a member for forming extrusions is different from that shown in the embodiment 5. The other structures are the same as those of the embodiment 5. Therefore, description thereof will be omitted. Now, the description will be made of the member 85 for forming extrusions as given below.

The member 85 for forming extrusions is prepared by a synthetic quartz base board. On the outer circumference (portion indicated by slanted lines), a totally reflective film 85a for the beam of 248 nm wavelength is coated. Also, on the lower part of the region surrounded by the totally reflective film 85a (portion indicated by horizontal lines), a transmitting film 85b, which transmits a 30% of the beam of 248 nm, is coated.

Figure 15:
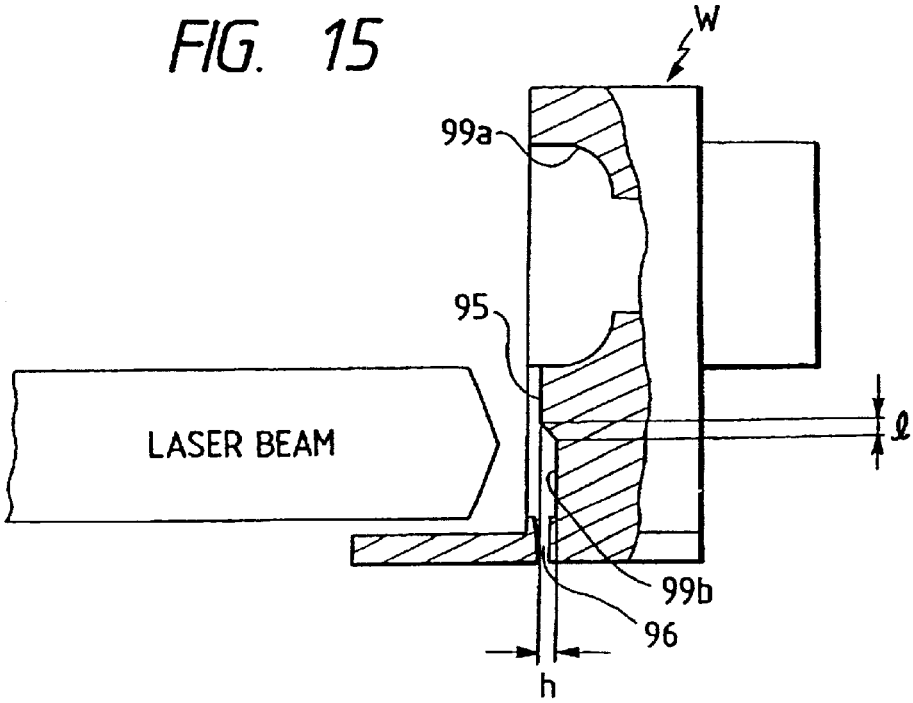
FIG. 15 is a partial cross-sectional view which shows a workpiece whose grooves are processed by a laser processing apparatus using the mask unit represented in FIG. 14.

Using the mask unit 80 structured as described above, groove processing is performed on a workpiece W under the same processing conditions as the embodiment 5. Such workpiece is represented in FIG. 15. As shown in FIG. 15, the extrusion 95 is formed in step on the end portion of the groove 99b, processed by the irradiation of the laser beam on the recess 99a side. The depth of the groove 99b becomes smaller in the portion where the extrusion 95 is formed. An ink jet recording head is manufactured by coupling the workpiece W with such grooves 99b serving as the ceiling board to the base board where the energy generating elements are arranged. In this way, the ink paths are formed by the grooves 99b and the base board, while the ink liquid chamber is formed by a recess 99a and the base board. In the ink liquid chamber, the extrusion 95 is formed which functions as resistance to ink flow. Therefore, with this extrusion 95, the supply force to the ink discharge ports 96 side is controlled, and at the same time, the escape of ink foaming energy to the ink liquid chamber side is prevented.

In the present embodiment, it is possible to form with a single processing the groove 99b of depth, 50 $\mu$m×width, 50 $\mu$m, and the height h of the extrusion being 35 $\mu$m, with the tapering dimension 1 being 10 $\mu$m in the stepped portion. The height h of the extrusion 95 can be adjusted by changing the transmissivity of the transmitting film 85b shown in FIG. 14. The tapering dimension 1 in the stepping portion can be adjusted by changing the distance L from the surface of the mask 87 to the member 85 for forming extrusion shown in FIG. 14. Also, in the present embodiment, while the description has been made of the case where the extrusion 95 has only one step, it is possible to provide a plurality of steps in the extrusion just by coating on the member 85 for forming extrusions the plural kinds of transmitting films which provide different transmissivities of laser beam accordingly.

In each of the embodiments described above, the examples as shown, in which the projection optical system 8b is used (see FIG. 7). However, it may be possible to use a processing apparatus of the contact type which processes by arranging a workpiece and a mask to be in contact with each other without adopting any projection optical system 8b. Also, in each of the embodiments described above, the examples are shown, in which a ceiling board, one of the parts constituting an ink jet recording head, is being processed by use of the laser processing apparatus of the present invention, but this apparatus can be used not only for laser processing, but also can be adopted as an exposure equipment for the photo-sensitive resin which is used when manufacturing a semiconductor or the like.

Now, the description will be made of an ink jet recording apparatus in accordance with the present invention.

Figure 16:
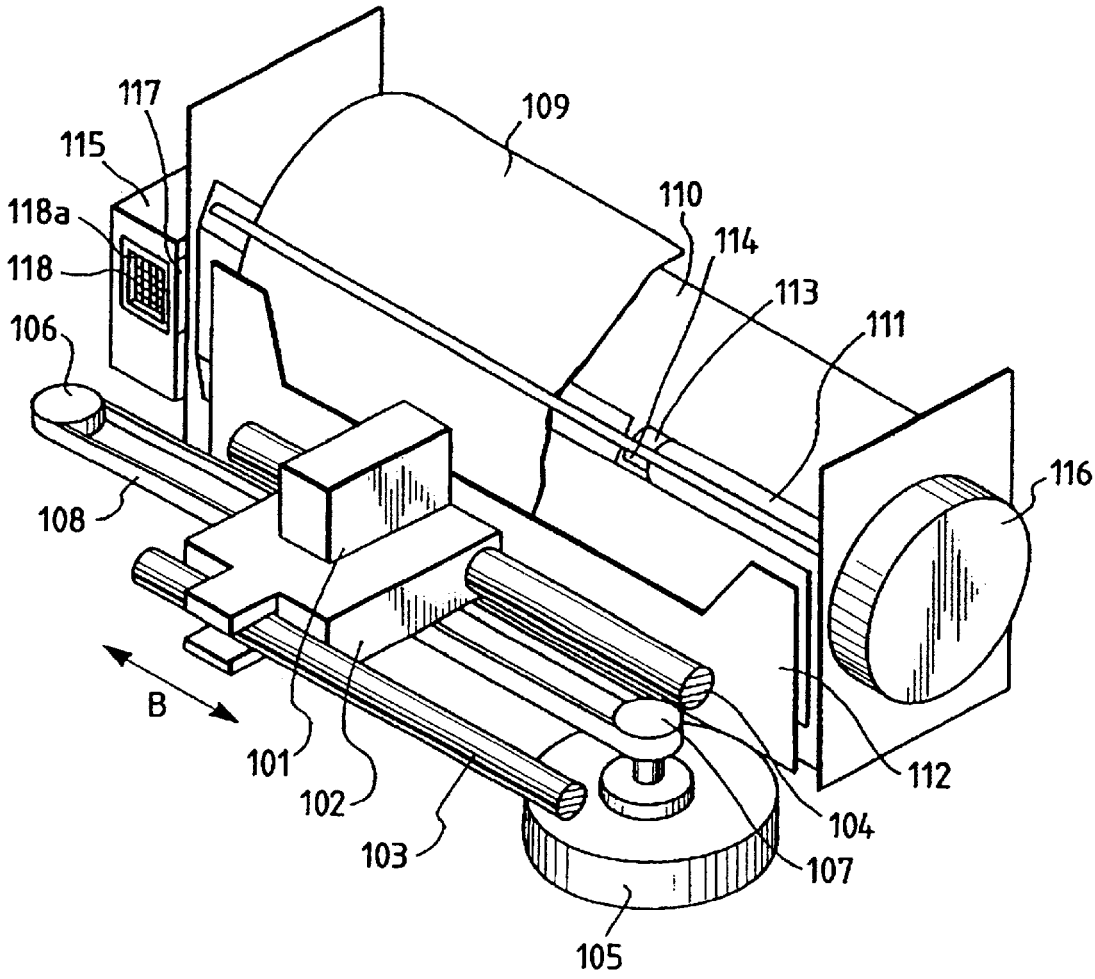
FIG. 16 is a perspective view which schematically shows one embodiment of an ink jet recording apparatus in accordance with the present invention.

In FIG. 16, an ink jet recording heat 101 which records desired images by discharging ink in response to given recording signals is of the same structure as that of the ink jet recording head described above.

A carriage 102 upon which the ink jet recording head 101 is mounted is fitted into two guide shafts 103 and 104 slidably in the directions indicated by arrows B, and is coupled to one portion of a timing belt 108 tensioned around a pulley 107 fixed to the output shaft of a carriage motor 105 and a polly 106 rotatively supported by a shaft. The ink jet recording head 101 is structured to reciprocate in the directions indicated by the arrows B when the timing belt 108 rotates regularly or inversely following the regular or inverse rotation of the pulley 107 by application of driving force of the carriage motor 105.

A recording sheet 109, a recording material, is guided by a paper pan 110 and fed by a feed roller (not shown) with which a pinch roller is in contact under pressure. This feeding is performed by a sheet feed motor 116 as its driving source. The recording sheet 109 thus fed is tensioned by means of a sheet exhaust roller 113 and a spur 114, and pressed to a heater 111 by means of a sheet pressure board 112 formed by an elastic material. As a result, it is fed while being pressed to the heater 111. The recording sheet 109 to which discharged ink adheres by the ink jet recording head 101 is warmed up by the heater 111. Thus the moisture of the adhering ink is evaporated to allow the ink to be fixed on the recording sheet 109.

Figure 8:
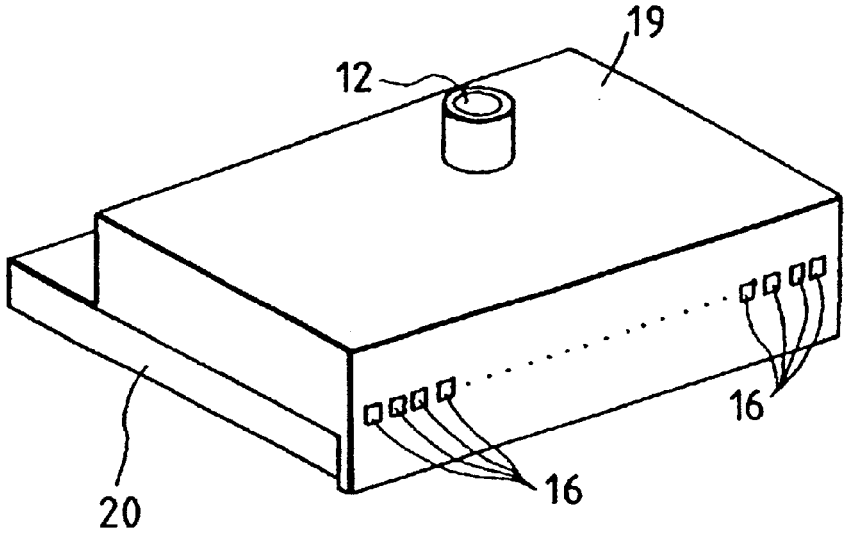
FIG. 8 is a perspective view which shows a part of an ink jet recording head finely processed by a laser processing apparatus of the present invention.

A recovery unit 115 is provided to maintain the discharging properties at a normal condition by removing foreign particles and overly viscous ink adhering to the discharge ports 16 of the ink jet recording head 101 (see FIG. 8).

The recovery unit 115 is provided with a cap 118a to cap the discharge ports of the ink jet recording head 111, thus preventing any clogging from taking place. In the interior of the cap 118a, an ink absorbent 118 is arranged.

Also, on the recording area side of the recovery unit 115, a cleaning blade 117 is provided for cleaning foreign particles and ink droplets adhering to the surface where the discharge ports 16 are formed.

The ink jet recording head, the laser processing apparatus, and ink jet recording apparatus in accordance with the present invention serve to bring about excellent effects on the recording head and recording apparatus of the ink jet method, particularly of the method in which recording is performed by forming flying droplets using thermal energy.

Regarding the typical structure and operational principle of such a method, it is preferable to adopt those which can be implemented using the fundamental principle disclosed in the specifications of U.S. Pat. Nos. 4,723,129 and 4,740,796. This method is applicable to the so-called on-demand type recording system and a continuous type recording system as well. Particularly, however, the method is suitable for the on-demand type because the principle is such that at least one driving signal, which provides a rapid temperature rise beyond a departure from nucleation boiling point in response to recording information, is applicable to an electrothermal transducing element disposed on a liquid (ink) retaining sheet or liquid passage whereby to cause the electrothermal transducing element to generate thermal energy to produce film boiling on the thermoactive portion of recording head, thus effectively leading to the resultant formation of a bubble in the recording liquid (ink) one to one in response to each of the driving signals. By the development and contraction of the bubble, the liquid (ink) is discharged through each discharging port to produce at least one droplet. The driving signal is more preferably in the form of pulses because the development and contraction of the bubble can be effectuated instantaneously, and, therefore, the liquid (ink) is discharged with particularly quick response.

The driving signal in the form of pulses is preferably such as disclosed in the specification of U.S. Pat. Nos. 4,463,359 and 4,345,262. In this respect, the temperature increasing rate of the heating surface is preferably such as disclosed in the specification of U.S. Pat. No. 4,313,124 for an excellent recording in a better condition.

The structure of the recording head may be as shown in each of the above-mentioned specifications wherein the structure is arranged to combine the discharging ports, liquid paths, and the electrothermal transducing elements (linear type liquid paths or right-angled liquid paths). Besides, the structure such as disclosed in the specifications of U.S. Pat. Nos. 4,558,333 and 4,459,600 wherein the thermal activation portions are arranged in a curved area is also included in the present invention.

In addition, the present invention is effectively applicable to the structure disclosed in Japanese Patent Laid-Open Application No. 59-123670 wherein a common slit is used as the discharge ports for plural electrothermal transducing elements, and to the structure disclosed in Japanese Patent Laid-Open Application No. 59-138461 wherein an aperture for absorbing pressure wave of the thermal energy is formed corresponding to the discharge ports.

Furthermore, as a full-line type recording head where its length is provided for the width of a maximum recordable medium which can be recorded by such recording apparatus, the present invention is applicable to either the structure which can satisfy such length by combining a plurality of recording heads disclosed in the specifications described above or the structure in which one recording head is integrally formed for the purpose.

In addition, the present invention is effectively adoptable irrespective of whether the recording head as of an exchangeable chip type which can be electrically connected with the apparatus main body or to which ink can be supplied from the apparatus main body when the head is installed in it, or the recording head of a cartridge type in which an ink tank is formed together with the recording head itself.

Also, for the present invention, it is preferable to additionally provide a recording heat with recovery means and preliminary auxiliary means as constituents of the recording apparatus because these additional means will contribute to making the effectiveness of the present invention more stabilized. To name them specifically, these are pressing or sucking means with respect to a recording head, preheating means such as electrothermal transducing elements or heating elements other than such transducing elements or the combination of those types of elements, and the adoption of a predischarge mode, which performs discharge other than the regular discharge. This mode is also effective in executing a stabilized recording.

Moreover, as the recording mode of the recording apparatus, the present invention is extremely effective when applied not only in the recording mode in which only major color such as black is used, but also, in using an apparatus which is provided with at least either one of complex colors having different colors and full color arranged by mixing colors irrespective of a recording head being integrally structured or it is structured by combination of plural heads.

In the embodiments of the present invention described above, while the ink has been described as liquid, it may be an ink material which is solidified below the room temperature but liquefied at the room temperature or in the form of liquid, or in the ink jet method described above, it is generally practiced that the temperature adjustment of ink itself is conducted in a range of temperatures not lower than 30° C. and not higher than 70° C. in order to stabilize its viscosity for the provision of the stable discharge. Therefore, it is good enough if ink can be liquefied when the recording signals are provided for use.

In addition, while positively preventing the temperature from rising due to the thermal energy by consuming such energy as an energy to be utilized for changing states of ink from solid to liquid, or by use of the ink which will be solidified when left intact for the purpose of preventing the ink from being evaporated, it may be possible to adopt the present invention for use of an ink having a nature of being liquefied only by the application of thermal energy, such as an ink capable of being discharged as ink liquid by enabling itself to be liquefied anyway when the thermal energy is given in accordance with recording signals, and an ink which will have already begun solidifying itself by the time it reaches a recording medium. In such a case, it may be possible to retain the ink in the form of liquid or solid in the recesses or through holes of a porous sheet such as disclosed in Japanese Patent Laid-Open Application No. 54-56847 or 60-71260 in order to enable the ink to face the electrothermal transducing elements. In the present invention, the most effective method for the various kinds of ink mentioned above is the one which is capable of implementing the film boiling method as described above.

Further, as the mode of the recording apparatus in accordance with the present invention, it may be possible to adopt a copying apparatus combined with a reader in addition to the image output terminal which is integrally or independently provided for a word processor, a computer, or other information processing apparatuses, and further, it may be possible to adopt the mode of a facsimile apparatus having transmission and reception functions.

As described above, in accordance with the present invention, a filter unit can be arranged by a single processing in the ink path and/or in the common liquid chamber. Also, with the provision of this filter unit, it becomes possible to take a required measure against dust particles. As a result, a yield rate can be improved, leading to the achievement of reducing the processing cost. Further, the filter unit can be arranged in an arbitrary position, and also, the filter gap can be set freely. Therefore, not only the provision of the filter unit contributes to taking a countermeasure against dust particles, but also, to suppress the extent of backward meniscus retraction when printing at high frequencies. Hence the discharge stabilization is enhanced to make high speed printing possible.

Also, a laser processing apparatus for the present invention can include a member for reflecting or absorbing at least a part of laser beam in a position apart from the surface of a mask within the luminous flux of the laser beam. Therefore, it is possible to process by a single processing a three-dimensional configuration in the direction in which the laser beam is irradiated. Thus, there is no need for any means for positioning the processing for the second time and on because a three-dimensional configuration can be processed by only a one-time processing. This makes it possible to simplify the structure of the laser processing apparatus, resulting in the reduction of the processing cost of a workpiece eventually, while the process itself can be built at a lower cost.

Also, the aforesaid member can be installed with its position relatively adjustable with respect to the mask, making it possible to adjust the position and height of a three-dimensional portion with respect to the processing part of a workpiece. Therefore, when the aforesaid member is installed fixedly with respect to the mask, it is possible to determine the processing configuration of a workpiece uniquely. Further, more complicated configuration can be processed by arranging the aforesaid member so that the transmissivity of laser beam is caused to differ depending on the different regions of the member. Then, by arranging the laser light source to enable it to generate ultraviolet pulse laser, polymer resin can be processed finely.

An ink jet recording head and ink jet recording apparatus of the present invention are such that grooves formed on a board member thereof are processed by a laser processing apparatus of the present invention. Therefore, it is possible to form the grooves each with an extrusion by only a single processing. As a result, superior discharge properties can be obtained without marring productivity when a head is manufactured, as compared to those having no extrusions.

Also, the board member is formed by polymer resin while using a laser light source which can generate ultraviolet pulse laser as the one for the laser processing apparatus of the present invention. Hence the grooves can be processed finely, resulting in the provision of the stabilized ink discharges.

What is claimed is:

1. A method for manufacturing an ink jet recording head, comprising the steps of:

forming on a base board a recess portion serving as a part of an ink passage [leading to] *communicating with* an ink discharge [opening] *portion* and a projection having a shape in [said] *the* ink passage by [a] laser irradiation through a mask portion having a predetermined mask pattern corresponding to the shape of [said] *the* projection, wherein [said] *the* mask pattern [at least one of] reflects [and] *or* absorbs at least a part of [said] *the* laser [irradiation;] *radiation;* and forming [said] *the* ink passage by coupling a side of [said] *the* base board on which [said] *the* recess portion is formed to another base board.

2. A method for manufacturing an ink jet recording head according to claim 1, wherein [said] *the* ink passage comprises a plurality of flow paths communicating with respective [said] ink discharge openings *in the ink discharge portion* and a common liquid chamber communicating with [said] *the* flow paths.

3. A method for manufacturing an ink jet recording head according to claim 2, wherein [said] *the* projection comprises a filter, and [said] *the* projection is disposed in a given [said] *one of the* flow path*s*.

4. A method for manufacturing an ink jet recording head according to claim 3, wherein [said] *the* projection is column-shaped.

5. A method for manufacturing an ink jet recording head according to claim 2, wherein [said] *the* projection comprises a filter located in the vicinity of an opening [communicating with said flow paths] in [said] *the* common liquid chamber, *the opening communicating with the flow paths.*

6. A method for manufacturing an ink jet recording head according to claim 5, wherein [said] *the* projection is column-shaped.

7. A method for manufacturing an ink jet recording head according to claim 2, wherein [said] *the* common liquid chamber is formed by molding and [said] *the* flow path*s* [is] *are* formed by laser processing.

8. A method for manufacturing an ink jet recording head according to claim 1, wherein an energy generation means for generating energy for discharging [the] ink from [said discharge opening] *the ink discharge portion* is provided at a portion on [said] *the* other board corresponding to [the] *a* position of [said] *the* ink passage.

9. A method for manufacturing an ink jet recording head according to claim 8, wherein [said] *the* energy generating means is an electro-thermal energy conversion element which generates heat energy as [said] *the* energy.

10. A method for manufacturing an ink jet recording head, [wherein] *comprising the step of:*

*forming* a recess portion serving as an ink passage communicating with an ink discharge portion and a projection having a shape and provided in [said] *the* ink passage [are formed] by [a] laser irradiation through a mask portion having a predetermined mask pattern corresponding to the shape of [said] *the* projection, wherein [said] *the* mask pattern [at least one of] reflects [and] *or* absorbs at least a part of [said] *the* laser [irradiation] *radiation.*

11. A method for manufacturing an ink jet recording head according to claim 10, wherein [said] *the* ink passage comprises a plurality of flow paths communicating with respective [said] ink discharge openings *in the ink discharge portion* and a common liquid chamber communicating with [said] *the* flow paths.

12. A method for manufacturing an ink jet recording head according to claim 11, wherein [said] *the* projection comprises a filter located in a given [said] *one of the* flow path*s*.

13. A method for manufacturing an ink jet recording head according to claim 12, wherein [said] *the* projection is column-shaped.

14. A method for manufacturing an ink jet recording head according to claim 11, wherein [said] *the* projection comprises a filter located in the vicinity of an opening [communicating with said flow paths] in [said] *the* common liquid chamber, *the opening communicating with the flow paths.*

15. A method for manufacturing an ink jet recording head according to claim 14, wherein [said] *the* projection is column-shaped.

16. A method for manufacturing an ink jet recording head according to claim 10, wherein an energy generating means for generating energy for discharging [the] ink from [said] *the ink* discharge [opening] *portion* is provided in [said liquid] *the ink* passage.

17. A method for manufacturing an ink jet recording head according to claim 16, wherein [said] *the* energy generating means is an electro-thermal energy conversion element which generates heat energy as [said] *the* energy.

*18. A method for manufacturing a board member for use in an ink jet recording head, the board member including a recess that serves as part of an ink passage in fluid communication with an ink discharge opening and a plurality of protrusions arranged in the recess, said method comprising the steps of:*

*providing a board member formed of polymer resin; and*

*irradiating a laser beam through a mask portion having a mask pattern corresponding to a shape of the plurality of protrusions, the mask pattern reflecting at least a part of the laser beam or absorbing at least a part of the laser beam.*

* * * * *

UNITED STATES PATENT AND TRADEMARK OFFICE

CERTIFICATE OF CORRECTION

PATENT NO. : RE 38,710 E
APPLICATION NO. : 09/935689
DATED : March 15, 2005
INVENTOR(S) : Akira Goto et al.

It is certified that error appears in the above-identified patent and that said Letters Patent is hereby corrected as shown below:

COLUMN 4
Line 44, “transmissively” should read --transmissivity--.

COLUMN 10
Line 13, “view” should read --view which--.
Line 17, “last” should read --laser--.
Line 44, “köhler” should read --Köhler--.

COLUMN 11
Line 1, “workpieces” should read --workpiece--.
Line 3, “works” should read --workpieces--.
Line 58, “converting” should read --converging--.

COLUMN 12
Line 19, “protein” should read --present--.

COLUMN 14
Line 3, “aspect,” should read --respect,--.
Line 46, “extrusion” should read --extrusions--.
Line 64, “fixedly” should read --fixed--.

COLUMN 15
Line 18, “selling” should read --setting--.
Line 51, “the” should read --an--.

COLUMN 16
Line 8, “as” should read --are--.
Line 23, “heat” should read --head--.
Line 32, “polly 106” should read --pulley 106--.

UNITED STATES PATENT AND TRADEMARK OFFICE

CERTIFICATE OF CORRECTION

PATENT NO. : RE 38,710 E
APPLICATION NO. : 09/935689
DATED : March 15, 2005
INVENTOR(S) : Akira Goto et al.

It is certified that error appears in the above-identified patent and that said Letters Patent is hereby corrected as shown below:

COLUMN 17
Line 61, "as" should read --is--.

COLUMN 19
Line 10, "for" should read --of--.

COLUMN 20
Line 21, "energy generation" should read --energy generating--.

Signed and Sealed this

Twenty-second Day of January, 2008

JON W. DUDAS
*Director of the United States Patent and Trademark Office*